United States Patent [19]

Yamashita et al.

[11] Patent Number: 5,727,383
[45] Date of Patent: Mar. 17, 1998

[54] CATALYST DETERIORATION DETECTING APPARATUS AND EXHAUST EMISSION CONTROL DEVICE FAILURE DETECTING APPARATUS

[75] Inventors: Yukihiro Yamashita; Hisashi Iida, both of Kariya; Masaaki Nakayama, Toyoake, all of Japan

[73] Assignee: Nippondenso Co., Ltd., Kariya, Japan

[21] Appl. No.: 597,562

[22] Filed: Feb. 2, 1996

[30] Foreign Application Priority Data

Feb. 10, 1995 [JP] Japan .................... 7-023161
Apr. 20, 1995 [JP] Japan .................... 7-095587
Jun. 28, 1995 [JP] Japan .................... 7-162640

[51] Int. Cl.$^6$ ............................................. F01N 3/28
[52] U.S. Cl. ........................... 60/276; 60/277; 60/284
[58] Field of Search ........................ 60/277, 276, 284

[56] References Cited

U.S. PATENT DOCUMENTS

| | | | |
|---|---|---|---|
| 5,154,055 | 10/1992 | Nakens et al. | 60/276 |
| 5,261,230 | 11/1993 | Yuuki et al. | 60/277 |
| 5,526,643 | 6/1996 | Mukaihira | 60/276 |
| 5,606,855 | 3/1997 | Tomisawa | 60/277 |

FOREIGN PATENT DOCUMENTS

| | | |
|---|---|---|
| 312835 | 4/1989 | European Pat. Off. . |
| 2-136538 | 5/1990 | Japan . |
| 4-365951 | 12/1992 | Japan . |
| 6-508414 | 9/1994 | Japan . |
| 93/20340A2 | 10/1993 | WIPO . |
| WO 94/21902 | 9/1994 | WIPO . |

*Primary Examiner*—Douglas Hart
*Attorney, Agent, or Firm*—Nixon & Vanderhye P.C.

[57] ABSTRACT

An exhaust pipe of an internal combustion engine is equipped with a three-way catalytic converter. Provided upstream and downstream the converter are an A/F sensor and a downstream O2 sensor, respectively. A CPU executes air-fuel feedback control according to the readings from the A/F sensor. When the period of air-fuel ratio inversion by the downstream O2 sensor has exceeded a predetermined time, the CPU determines that the three-way catalytic converter is activated. At that point, the CPU estimates the quantity of heat required from the start-up of the engine up to catalyst activation. The quantity of heat is obtained by accumulating the intake air quantity from the start of the engine up to catalyst activation (i.e., accumulated intake air quantity). Given the accumulated quantity of heat calculated, the CPU determines accordingly whether the three-way catalytic converter has deteriorated.

25 Claims, 34 Drawing Sheets

FIG.18A
FIG.18B
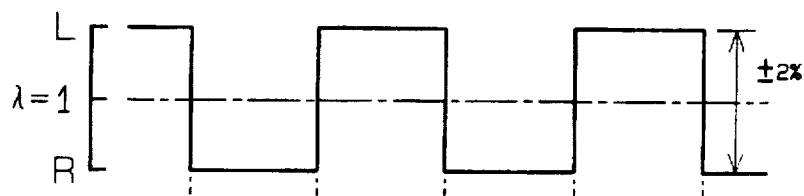
FIG.19
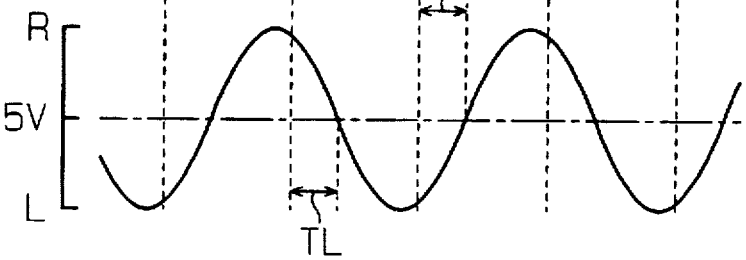
| TARGET A/F INVERSION | 15 | 20 | 25 | 30 | 35 |
|---|---|---|---|---|---|
| REF1 | 7000 | 7000 | 11000 | 11500 | 12500 |
| TARGET A/F INVERSION | 40 | 45 | 50 | 55 |
|---|---|---|---|---|
| REF1 | 13500 | 13800 | 13800 | 13800 |
(msec)

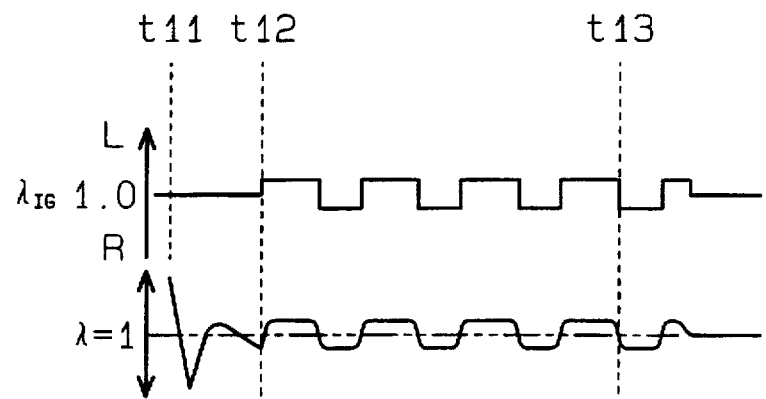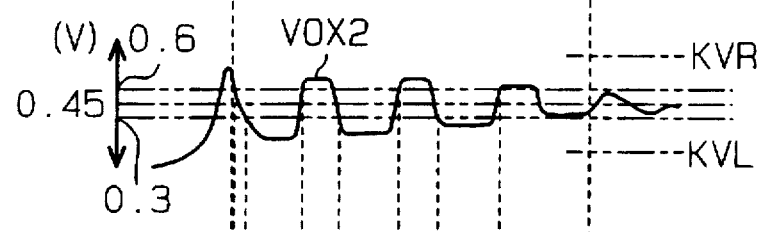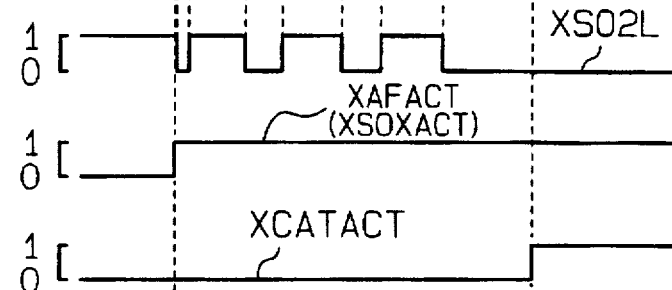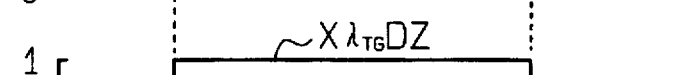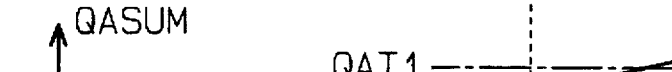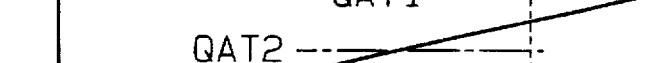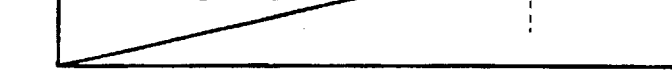

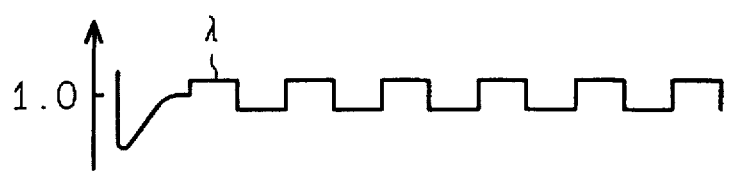
FIG. 37A1
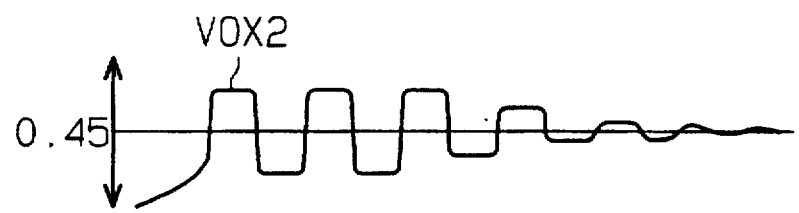
FIG. 37A2
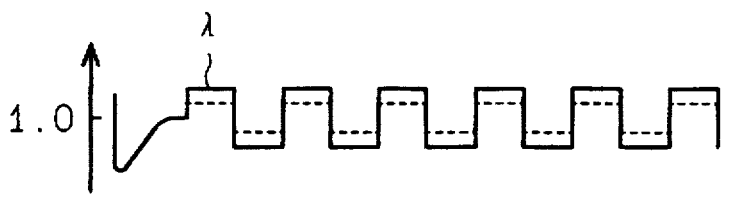
FIG. 37B1
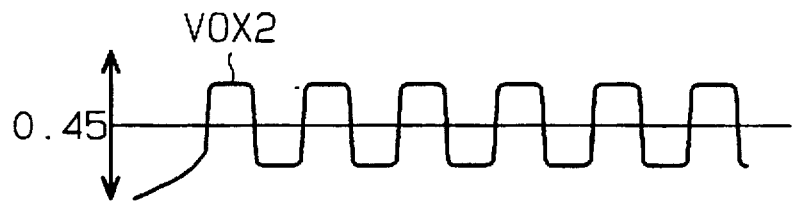
FIG. 37B2
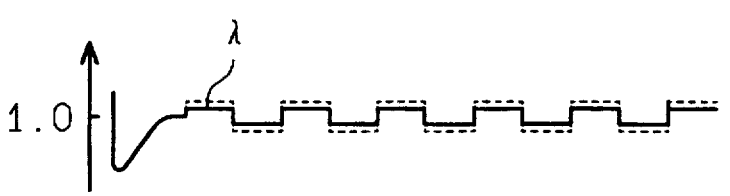
FIG. 37C1
FIG. 37C2

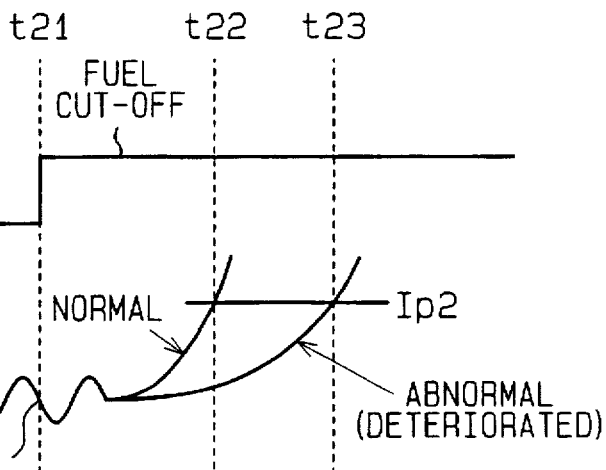
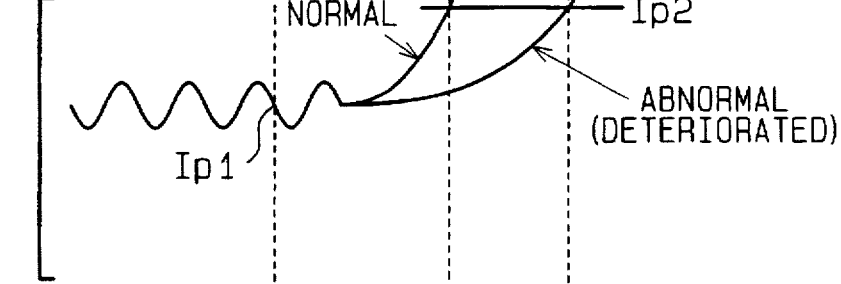
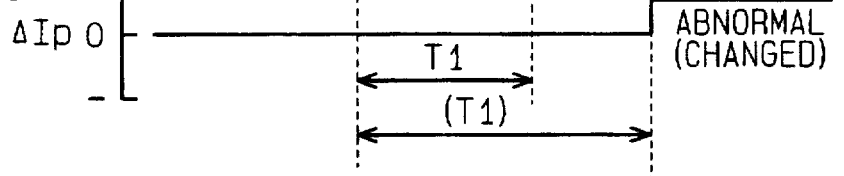

CATALYST DETERIORATION DETECTING APPARATUS AND EXHAUST EMISSION CONTROL DEVICE FAILURE DETECTING APPARATUS

BACKGROUND OF THE INVENTION

1. Field of the Invention

The present invention relates to a catalyst deterioration detecting apparatus for detecting a deterioration of a catalyst disposed in an exhaust system of an internal combustion engine. The invention also relates to an apparatus for detecting a failure of an exhaust emission control device including air-fuel ratio sensors disposed upstream and downstream of the catalyst.

2. Description of Related Art

There have been proposed catalyst deterioration detecting apparatuses for detecting the deterioration of a catalyst (mainly a three-way catalyst) by calculating the purification capability (i.e., purification factor) of the catalyst after its activation (as disclosed illustratively in Japanese Patents Laid-Open Nos. Hei 2-136538 and Hei 3-253714).

Japanese Patent Laid-Open No. Hei 2-136538 discloses a catalyst deterioration detecting apparatus that detects a lean-to-rich inversion time of air-fuel ratio upon resumption of fuel supply after its interruption (i.e., fuel-cut) as in the case of vehicle deceleration. If the inversion time is found to be shorter than a predetermined time, the disclosed apparatus considers the catalyst to possess a reduced oxygen storage volume at a fuel-cut time. That is, the apparatus detects the deterioration of the catalyst based on its lowered purification factor.

Japanese Patent Laid-Open No. Hei 3-253714 discloses an apparatus having air-fuel ratio sensors disposed upstream and downstream of a catalyst. When the air-fuel ratio changes from a rich state to a lean state, the disclosed apparatus calculates the difference between a response delay time of the upstream O2 sensor and that of the downstream O2 sensor. Based on the response delay time difference thus calculated, the apparatus calculates the purification factor of a three-way catalytic converter. With the purification factor calculated, the apparatus detects the deterioration of the catalyst accordingly.

Where the catalyst is checked conventionally for deterioration in accordance with the purification factor of the catalyst following its activation, the deterioration of the catalyst may not be accurately detected for the following reason. The catalyst is known to have its purification capability fully at temperatures higher than a predetermined activation temperature (generally 300° C. to 400° C.), whereas increased emissions are discharged before activation of the catalyst. The greater the degree of deterioration of the catalyst, the greater the quantity of emissions discharged therethrough. With conventional catalyst deterioration detecting apparatuses, it is difficult to detect catalyst deterioration by taking into account the degree of emission increase before catalyst activation. This means that with the quantity of emissions raised, a catalyst which has in fact deteriorated can be erroneously regarded as normal.

SUMMARY OF THE INVENTION

It is therefore an object of the present invention to overcome the above and other deficiencies of the prior art.

It is another object of the present invention to provide a catalyst deterioration detecting apparatus capable of detecting deterioration of a catalyst, thereby monitoring the catalyst appropriately.

According to a first aspect of the invention, when a catalyst is determined to be activated, deterioration of a catalyst is detected in accordance with a quantity of heat required from a start-up of an internal combustion engine until an activation of the catalyst. That is, the catalyst provides its purification capability fully at temperatures higher than a predetermined activation temperature. As the deterioration of the catalyst progresses, the resulting drop in the heat of reaction generated by the catalyst delays catalyst activation. In such a state, a larger quantity of emissions is discharged before activation of the catalyst. The degree of emission increase corresponds to the energy (quantity of heat) required to activate (i.e., to warm up) the catalyst. Thus estimating the quantity of heat required up to catalyst activation makes it possible to detect that deterioration of the catalyst which corresponds to the increased degree of emission quantities. Here, the determination that the catalyst is activated covers cases in which the catalyst is considered or estimated as activated when a predetermined time has elapsed since the start-up of the engine.

According to a second aspect of the present invention, deterioration of a catalyst is determined when the catalyst is determined to be activated. The deterioration is determined in accordance with a quantity of heat required from a start-up of the internal combustion engine until activation of the catalyst. The deterioration of the catalyst is determined further in accordance with output characteristic of a downstream air-fuel ratio sensor while the catalyst is being activated. It is finally determined whether the catalyst has deteriorated based on the first determination as well as on the second determination.

That is, when a determination is made of catalyst deterioration based on the quantity of heat required up to the activation of the catalyst, symptoms of the deterioration may not be conspicuous at the time of the determination but may later become pronounced in the course of normal operation. Thus if possible deterioration of the catalyst is determined to exist according to the quantity of heat required up to catalyst activation, that information (i.e., the first determination) is retained and later collated with the second determination so as to make the final determination on catalyst deterioration. This makes it possible to assess the deterioration of the catalyst appropriately when symptoms of the deterioration vary as described above.

According to a third aspect of the present invention, an upstream air-fuel ratio is so controlled as to eliminate the deviation from a target air-fuel ratio. It is determined whether a catalyst is activated on the basis of responsiveness of a downstream air-fuel ratio sensor with respect to changes in the upstream air-fuel ratio. Failure of any one of the catalyst, the upstream air-fuel ratio sensor and the downstream air-fuel ratio sensor is determined, in accordance with a quantity of heat required to activate the catalyst from the start-up of the internal combustion engine until the activation of the catalyst, the failure being detected when the catalyst activation is determined.

The catalyst may be determined to have deteriorated (known from insufficient rise of temperature) when the quantity of heat required from the start-up of the engine up to catalyst activation exceeds a predetermined value. In addition, the quantity of heat may also be used as the basis for checking the upstream or downstream air-fuel ratio sensor for failure. That is, if the upstream air-fuel ratio sensor is faulty, control of the air-fuel ratio feedback carried out as per the output of that faulty sensor is disrupted. This leads to degradation of the accuracy in determining the activation of the catalyst according to the responsiveness of the downstream air-fuel ratio sensor. Thus with the required quantity of heat being out of the allowable range, the catalyst may be determined to be normal and the upstream air-fuel ratio sensor to be faulty. If the downstream air-fuel ratio sensor is faulty, the accuracy in determining catalyst activation is worsened likewise. With the required quantity of heat also being out of the allowable range, the catalyst may be similarly determined to be normal and the downstream air-fuel ratio sensor to be faulty. As described, where the quantity of heat required from the start-up of the engine up to catalyst activation is used as a factor for failure detection, it is possible to detect appropriately a failure of the exhaust emission control device including the catalyst and the upstream and downstream air-fuel ratio sensors.

BRIEF DESCRIPTION OF THE DRAWINGS

In the accompanying drawings:

FIGS. 18A–18B are timing charts representing operations of a target air-fuel ratio and the downstream O2 sensor.

FIG. 19 is a table by which a deterioration reference value REF1 is obtained;

FIGS. 36A–36H are timing charts for explaining typical operations upon starting of the engine;

FIGS. 37A1–37C2 are waveforms for explaining abnormalities of the exhaust emission control device;

FIGS. 40A–40D are timing charts illustrating how the A/F sensor is determined to have failed.

DETAILED DESCRIPTION OF PRESENTLY PREFERRED EMBODIMENTS (First Embodiment)

Figure 1:
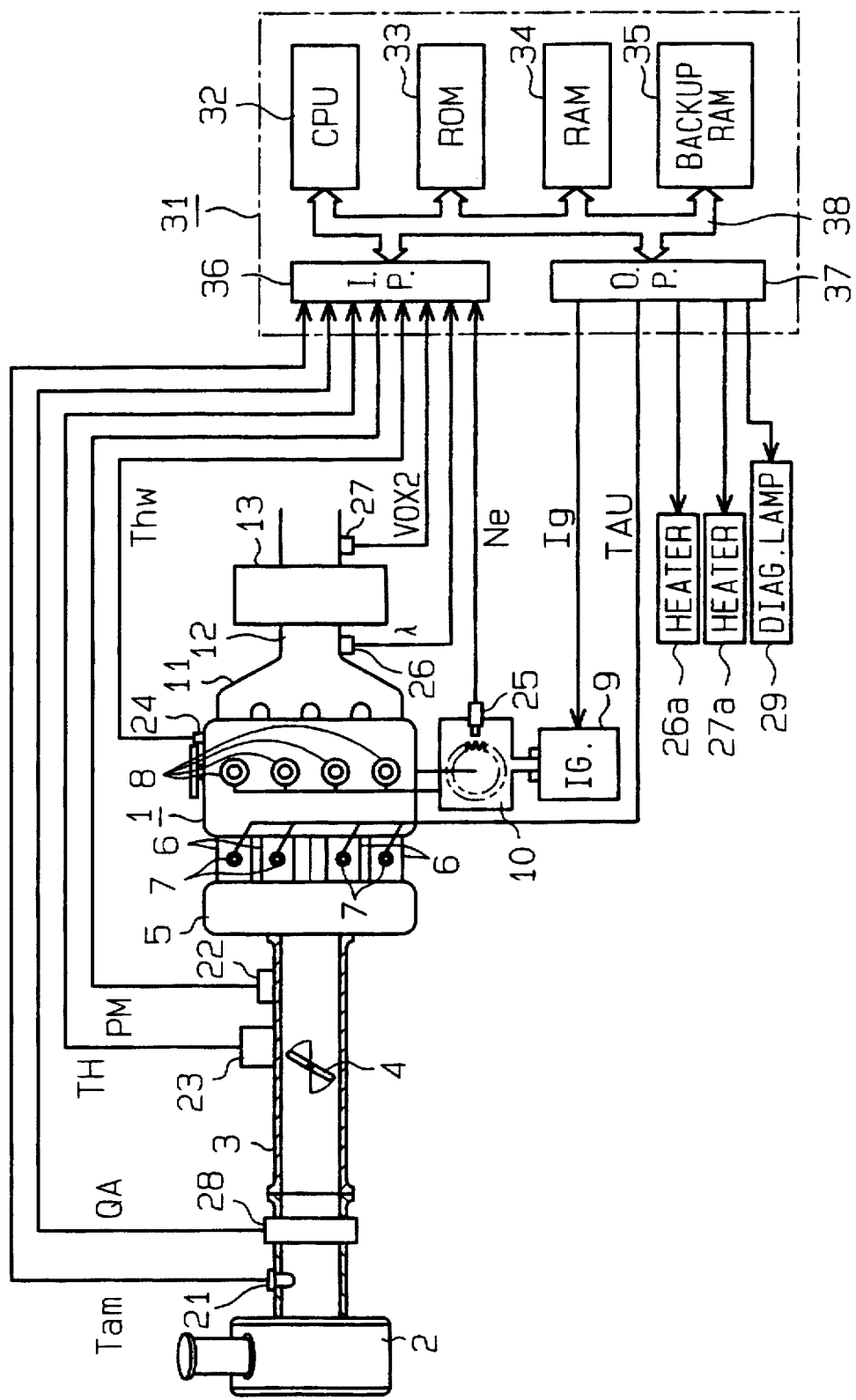
FIG. 1 is an overall block diagram of an internal combustion engine equipped with a fuel injection control device implemented as a first embodiment of the invention.

FIG. 1 is a schematic view of an internal combustion engine and its peripheral equipment including the fuel injection control device practiced as the first embodiment. As shown in FIG. 1, the internal combustion engine 1 is structured as a four-cylinder, four-cycle spark ignition engine. Inside the engine 1, intake air moves through an air cleaner 2, an intake pipe 3, a throttle valve 4, a surge tank 5 and intake manifolds 6, in that order from upstream to downstream. Inside each intake manifold 6, the intake air is mixed with fuel injected by each of fuel injection valves 7 to become an air-fuel mixture of a predetermined air-fuel ratio. The mixture is fed to each cylinder. An ignition plug 8 attached to each of the cylinders of the engine 1 is fed with a high voltage from an ignition circuit 9 via a distributor 10. Given the high voltage, the ignition plug 8 ignites the air-fuel mixture in each cylinder at suitably timed intervals. After combustion, the exhaust gas passes through exhaust manifolds 11 and an exhaust pipe 12. A three-way catalytic converter 13 attached to the exhaust pipe 12 removes noxious components (CO, HC, NOx, etc.) from the exhaust gas before it is discharged into the atmosphere.

The intake pipe 3 is furnished with an intake air temperature sensor 21, an intake air pressure sensor 22 and an air flow meter 28. The intake air temperature sensor 21 detects the temperature of intake air (Tam), the intake air pressure sensor 22 detects the pressure of intake air (PM) downstream of the throttle valve 4, and the air flow meter 28 detects the flow rate of intake air (QA). The throttle valve 4 is equipped with a throttle sensor 23 for detecting the opening of the throttle valve 4 (TH). The throttle sensor 23 outputs analog signals reflecting the throttle opening TH, and also outputs a detection signal indicating that the throttle valve 4 is closed substantially fully. The cylinder block of the internal combustion engine 1 includes a water temperature sensor 24 that detects the temperature of the cooling water (Thw) inside the engine 1. The distributor 10 is provided with a rotational speed sensor 25 for detecting the rotational speed (Ne) of the internal combustion engine 1. The rotational speed sensor 25 outputs 24 pulse signals equally apart, at intervals of two engine revolutions or 720° CA.

An A/F sensor (upstream air-fuel ratio sensor) 26 is provided upstream of the three-way catalytic converter 13 attached to the exhaust pipe 12. The A/F sensor 26 outputs linear air-fuel ratio $\lambda$ signals of a wide range in accordance with the oxygen density in the exhaust gas from the internal combustion engine 1. Downstream of the three-way catalytic converter 13 is a downstream O2 sensor (downstream air-fuel ratio sensor) 27. The sensor 27 outputs a voltage VOX2 corresponding to whether the air-fuel ratio $\lambda$ is on the rich or lean side of a stoichiometric air-fuel ratio ($\lambda$=1). The A/F sensor 26 and the downstream O2 sensor 27 are furnished with heaters 26a and 27a, respectively, for promoting their activation (sensors and heaters are shown separately in FIG. 1 for ease of understanding).

An electronic control unit (hereunder referred to as ECU) 31 is provided to control the operation of the internal combustion engine 1. The ECU 31 is designed to be a logic operation circuit comprising mainly a CPU (central processing unit) 32, a ROM (read-only memory) 33, a RAM (random access memory) 34 and a backup RAM 35. These components are connected to input and output ports 36 and 37 via a bus 38. The input port 36 receives detection signals from various sensors, and the output port 38 outputs control signals to various actuators. Through the input port 36, the ECU 31 receives such data as the intake air temperature Tam, intake air pressure PM, intake air flow rate QA, throttle opening TH, cooling water temperature Thw, engine rotational speed Ne and air-fuel ratio signals from the sensors. Given these values, the ECU 31 calculates control signals representing the fuel injection quantity TAU, ignition timing Ig and other control data. The control signals thus calculated are output via the output port 37 to the fuel injection valves 7 and the ignition circuit 9, among others. The ECU 31 further executes a catalyst deterioration determining routine, to be described later, to determine whether the three-way catalytic converter 13 has deteriorated. If the converter 13 is found to have deteriorated, a diagnostic lamp 29 is lit to warn the vehicle's driver of the failure. In the first embodiment, the CPU 32 constitutes the catalyst activation determining means, deterioration detecting means, accumulated intake air calculating means, fuel injection quantity calculating means, accumulated fuel quantity calculating means and air-fuel ratio control means.

Figure 2:
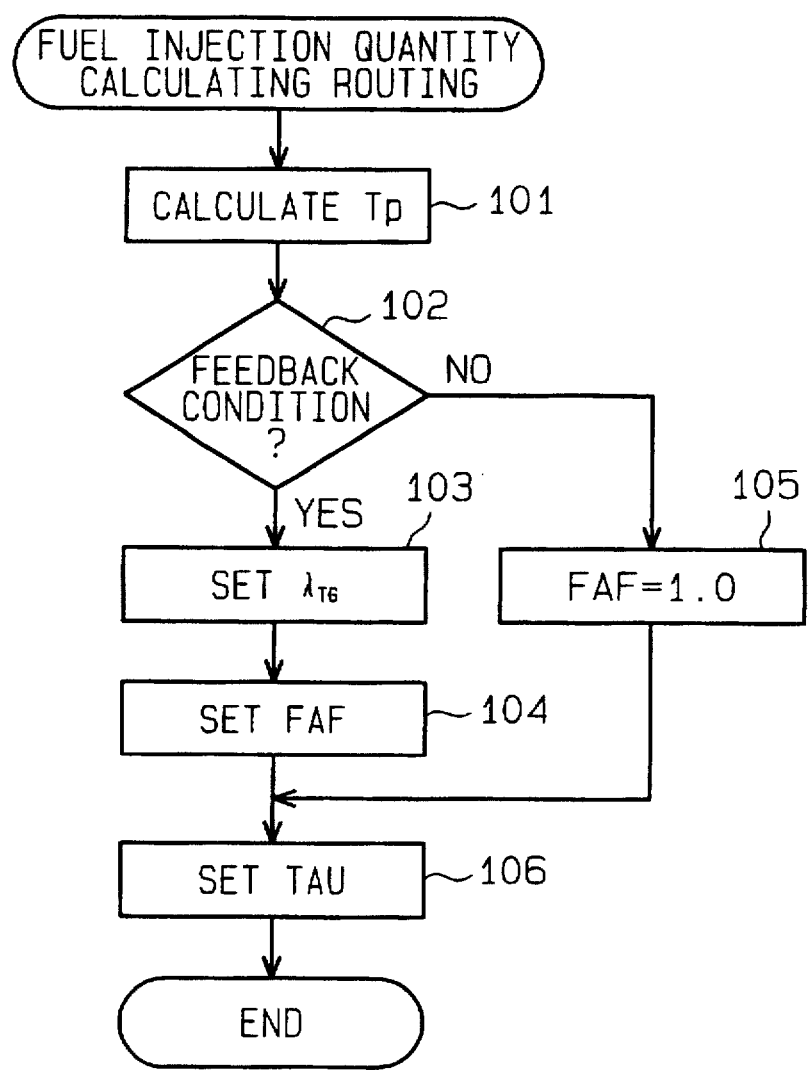
FIG. 2 is a flowchart of a fuel injection quantity calculating routine.

The fuel injection control device of the above construction will now be described with reference to FIGS. 2 through 10. FIGS. 2 through 7 are flowcharts of control programs executed by the CPU 32. The process shown in FIG. 2 is executed at intervals of fuel injections by each fuel injection valve 7. The processes in FIGS. 3 through 6 are each carried out at intervals of 32 ms, and the process in FIG. 7 is conducted at intervals of 8 ms. FIGS. 10A–10H are charts of timings representing specific component operations in effect at the start-up of the engine.

The operation of the first embodiment will now be outlined with reference to the timing charts of FIGS. 10A–10H. In FIGS. 10C–10H, the notation "XSO2L" stands for a lean state determination flag indicating that the air-fuel ratio detected by the downstream O2 sensor 27 is in a lean state; "XSO2ACT" denotes an O2 sensor activation flag indicating that the downstream O2 sensor 27 is activated; "XCATACT" is a catalyst activation flag indicating that the three-way catalytic converter 13 is activated; "FAF" is a feedback correction coefficient used for air-fuel ratio feedback control; "QASUM" is the accumulated intake air quantity calculated since the start-up of the engine; and "XCATDT" is a catalyst deterioration flag indicating that the three-way catalytic converter 13 has deteriorated.

In FIG. 10A, the internal combustion engine 1 is started at a time t1 (when an ignition key, not shown, is switched on). This turns on the heater 27a, initiating the heating of the downstream O2 sensor 27. When the output voltage VOX2 of the downstream O2 sensor 27 reaches a predetermined value (e.g., 0.45 V) at a time t2, a check is made to see if the sensor 27 is activated. At a time t3, air-fuel ratio feedback control is started.

At a time t4, a check is made to see if the three-way catalytic converter 13 is activated on the basis of the delay in the inverting period of the downstream O2 sensor 27. That is, if the downstream O2 sensor 27 is activated before the activation of the three-way catalytic converter 13 between the times t1 and t4, the detection signal from the downstream O2 sensor 27 responds without delay relative to the air-fuel ratio behavior upstream of the three-way catalytic converter 13. If the three-way catalytic converter 13 is activated at the time t4, the oxygen storage volume of the catalyst 13 causes delays in the response of the downstream O2 sensor 27 relative to changes in the air-fuel ratio. As a result, the period in which the air-fuel ratio is inverted between the rich and the lean state is prolonged.

At the time t4, a check is made to see if the three-way catalytic converter 13 is activated on the basis of the accumulated intake air quantity QASUM corresponding to the quantity of heat required to activate the three-way catalytic converter 13. That is, if the accumulated intake air quantity QASUM is high at this point in time, the three-way catalytic converter 13 is determined to have deteriorated; if the quantity QASUM is low, the catalyst is determined to be normal.

The process above is implemented by the CPU 32 whose operations will now be described in detail with reference to the flowcharts of FIGS. 2 through 7.

In executing the fuel injection quantity calculating routine of FIG. 2, the CPU 32 first calculates a basic fuel injection quantity Tp in step 101. The basic fuel injection quantity Tp is calculated illustratively by use of a fuel injection quantity map stored beforehand in the ROM 33 and in accordance with the engine rotational speed Ne and intake air pressure PM currently in effect. In step 102, the CPU 32 checks to see if the feedback condition of the air-fuel ratio λ is satisfied. As is understood, the feedback condition is met when the cooling water temperature Thw is higher than a predetermined value and when the engine is neither rotating at very high speed nor overloaded.

If the feedback condition is found to be satisfied (after the time t3 in FIGS. 10A–10F), the CPU 32 reaches step 103 in which a target air-fuel ratio λTG is set. In step 104, the CPU 32 sets a feedback correction coefficient FAF such as to make the air-fuel ratio λ equal to the target air-fuel ratio λTG. Here, the feedback correction coefficient FAF is calculated by use of the equation 1 shown below. Setting the feedback correction coefficient FAF is well known in the art and hence no detailed description is made for brevity.

$$FAF(k) = K1 \times \lambda(k) - \sum_{n=1}^{k} Kn+1 \times FAFn + ZI(k) \quad \text{[Equation 1]}$$

$$ZI(k) = ZI(k-1) + Ka \times (\lambda(k) - \lambda TG)$$

where, k is a variable representing the number of times feedback control is effected from the beginning of the first sampling, K1 through Kn+1 are optimum feedback gains, ZI(k) is an integration term, and Ka is an integration constant.

If the feedback condition is not met in step 102, the CPU 32 proceeds to step 105. In step 105, the CPU 32 sets the feedback correction coefficient FAF to "1.0." After calculating the feedback correction coefficient FAF, the CPU 32 proceeds to step 106. In step 106, the CPU 32 sets the fuel injection quantity TAU using the equation 2 shown below and on the basis of the basic fuel injection quantity Tp, feedback correction coefficient FAF and other correction coefficients (e.g., temperature and electrical load correction coefficients) FALL. With step 106 completed, the CPU 32 terminates this routine.

$$TAU=Tp \times FAF \times FALL \quad \text{[Equation 2]}$$

Figure 3:
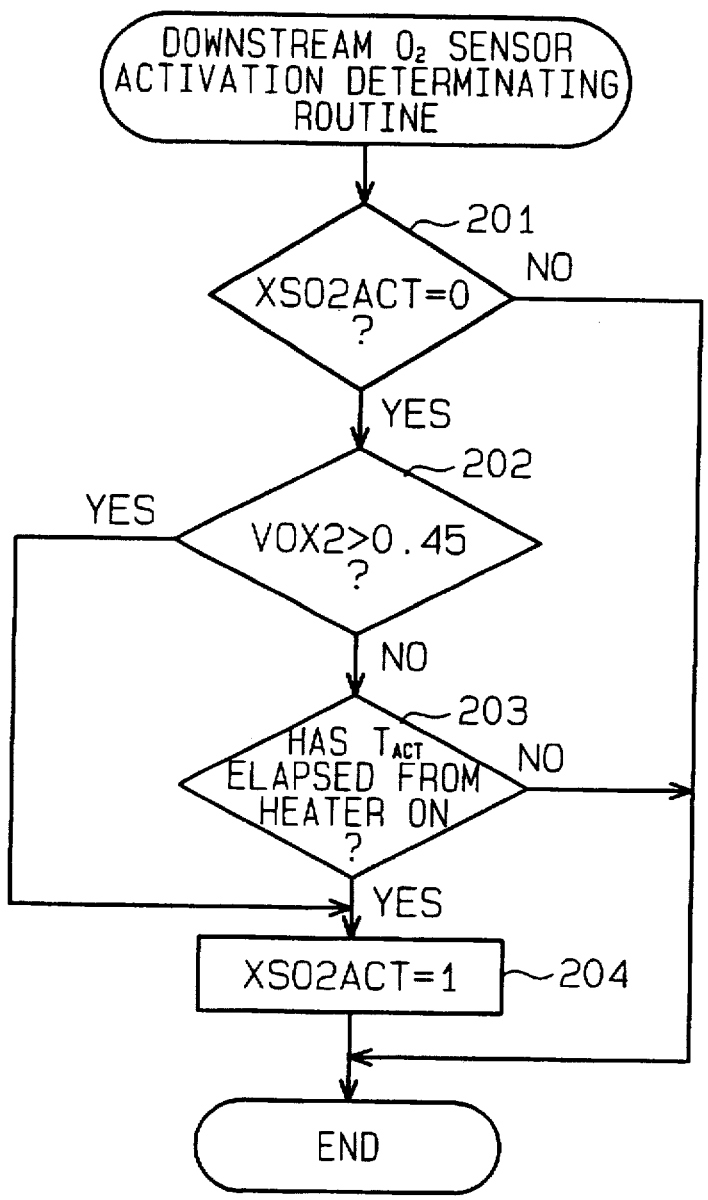
FIG. 3 is a flowchart of a routine for determining activation of a downstream O2 sensor.

In carrying out the routine for determining the activation of the downstream O2 sensor 27 in FIG. 3, the CPU 32 first checks in step 201 to see if the O2 sensor activation flag XSO2ACT is cleared to "0," i.e., if the activation of the downstream O2 sensor 27 has been recognized. If XSO2ACT=1 (activation recognized), this routine is terminated immediately. If XSO2ACT=0 (activation yet to be recognized), the CPU 32 proceeds to step 202. In step 202, the CPU 32 checks to see if the output voltage VOX2 of the downstream O2 sensor 27 is in excess of 0.45 V. If VOX2>0.45, the CPU 32 proceeds to step 204. In step 204, the CPU 32 sets the O2 sensor activation flag XSO2ACT to "1," before terminating this routine (at the time t2 in FIG. 10).

If VOX2≦0.45 V, the CPU32 proceeds to step 203. In step 203, a check is made to see if a predetermined time TACT (30 seconds in this example) has elapsed after the heater 27a of the downstream O2 sensor 27 was turned on. If the predetermined time TACT has yet to elapse, this routine is immediately terminated. If the time TACT is found to have elapsed, the CPU 32 proceeds to step 204. In step 204, the CPU 32 sets the O2 sensor activation flag XSO2ACT to "1," before terminating this routine. That is, even if VOX2≦0.45 V, the downstream O2 sensor 27 is considered activated as long as the heater 27a has remained on at least for the predetermined time TACT.

Figure 4:
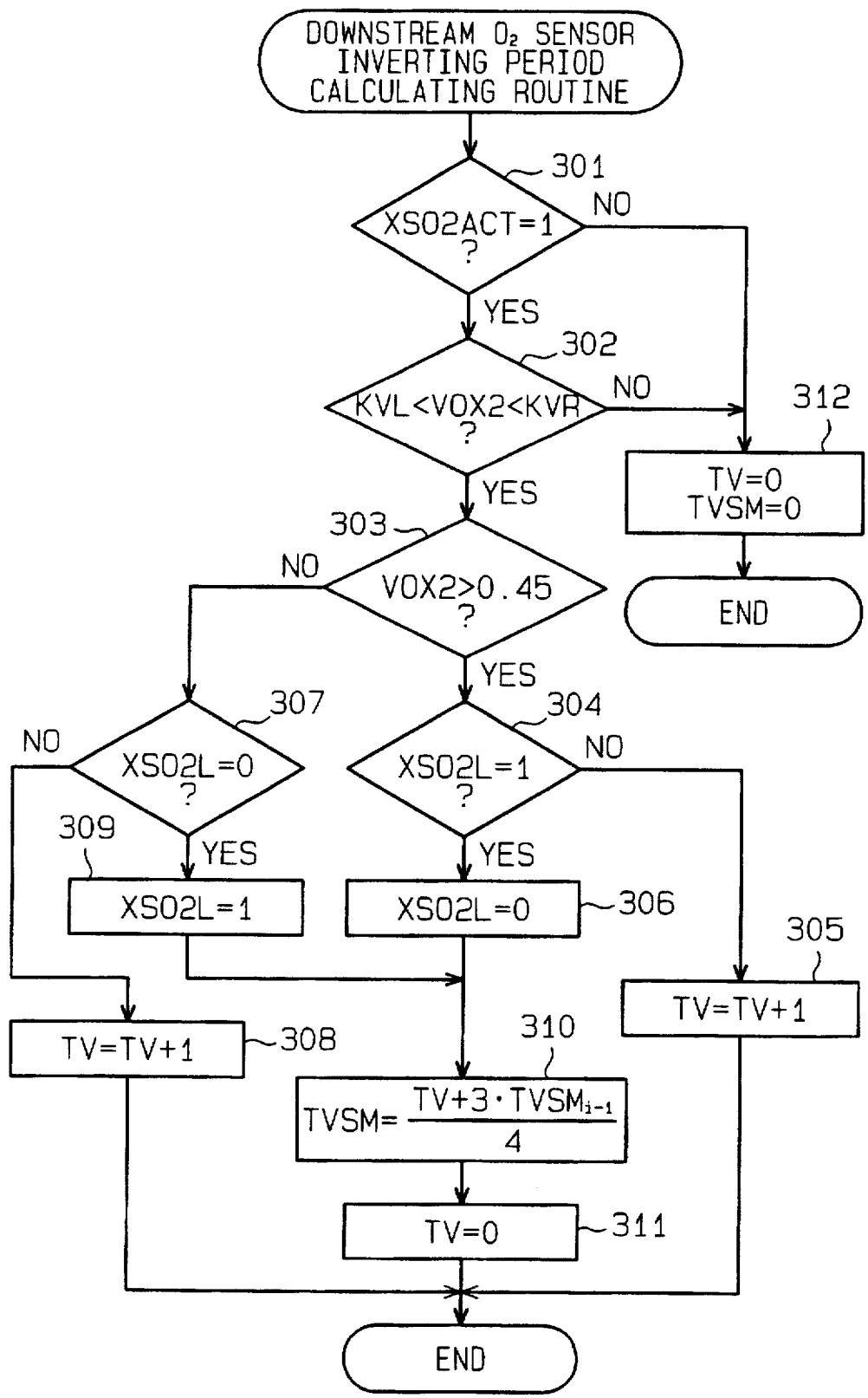
FIG. 4 is a flowchart of a routine for calculating inverting period of the downstream O2 sensor.

Meanwhile, in executing the routine for calculating the inverting period of the downstream O2 sensor 27 in FIG. 4, the CPU 32 first checks in step 301 to see if the O2 sensor activation flag XSO2ACT is set to "1." If XSO2ACT=1, the CPU 32 proceeds to step 302 (after the time t2 in FIGS. 10A–10D). In step 302, the CPU 32 checks to see if the output voltage VOX2 of the downstream O2 sensor 27 falls between an allowable lean value KVL and an allowable rich value KVR (i.e., if KVL<VOX2<KVR). If it is found that KVL<VOX2<KVR (where KVL=0.45−α, KVR=0.45+α), the CPU 32 proceeds to step 303. That is, when the results of the checks in steps 301 and 302 are both affirmative, the CPU 32 proceeds to step 303.

In step 303, the CPU 32 checks to see if the output voltage VOX2 of the downstream O2 sensor 27 is in excess of 0.45 V, i.e., if the downstream air-fuel ratio is in a rich state. If VOX2>0.45 V (rich state), the CPU 32 goes to step 304. In step 304, by referring to the lean determination flag XSO2L indicating the determination about the downstream air-fuel ratio in the preceding process (XSO2L=1 means "lean" determination), the CPU 32 checks to see if the air-fuel ratio is inverted from the lean state in the preceding process to a rich state in the current process. If the result of the check in step 303 is affirmative and that in step 304 is negative, it means the air-fuel ratio of the current process is kept in a rich state as in the case of the preceding process. In that case, the CPU 32 proceeds to step 305 and increments the inverting period TV by "1." The inverting period TV is a measured period in which the air-fuel ratio has continued in the same state (either rich or lean).

If the results of the checks in steps 303 and 304 are both affirmative, it means that the air-fuel ratio of the previous process was on the lean side while that of the current process is on the rich side. In that case, the CPU 32 goes to step 306 to clear the lean determination flag XSO2L to "0." Step 306 is followed by step 310 in which the CPU 32 calculates the averaged value TVSM of the inverting period TV using the equation 3 shown below.

$$TVSM=(TV+3 \; \overline{N} \; TVSMi-1)/4 \quad \text{[Equation 3]}$$

where TVSMi-1 is the preceding averaged value TVSM.

Thereafter, the CPU 32 clears the inverting period TV to "0" in step 311, and terminates this routine.

If it is found that VOX2≦0.45 V in step 303, i.e., if a lean state is detected, the CPU 32 proceeds to step 307. In step 307, a check is made on the basis of the lean determination flag XSO2L to see if the air-fuel ratio is inverted from the rich state in the preceding process to the lean state in the current process. If the results of the checks in steps 303 and 307 are both negative, it means the air-fuel ratio of the current process is in the lean state as in the case of the preceding process. In that case, the CPU 32 proceeds to step 308 and increments the inverting period TV by "1." If the result of the check in step 303 is negative and that in step 307 is affirmative, it means that the air-fuel ratio of the preceding process was on the rich side while the ratio of the current process is on the lean side. In that case, the CPU 309 goes to step 309 to set the lean determination flag XSO2L to "1." Step 309 is followed by step 310 in which the CPU 32 calculates the averaged value TVSM of the inverting period TV in the manner described above. Then the CPU 32 clears the inverting period TV to "0" in step 311, and terminates this routine.

If the result of the check in step 301 or 302 is negative, the CPU 32 proceeds to step 312. In step 312, the CPU 32 clears both the inverting period TV and its averaged value TVSM to "0" and terminates this routine. That is, when the downstream O2 sensor 27 has yet to be activated or when the air-fuel ratio deviates significantly from the stoichiometric air-fuel ratio, the detection of the inverting period TV is inhibited so as to prevent erroneous detection.

Figure 5:
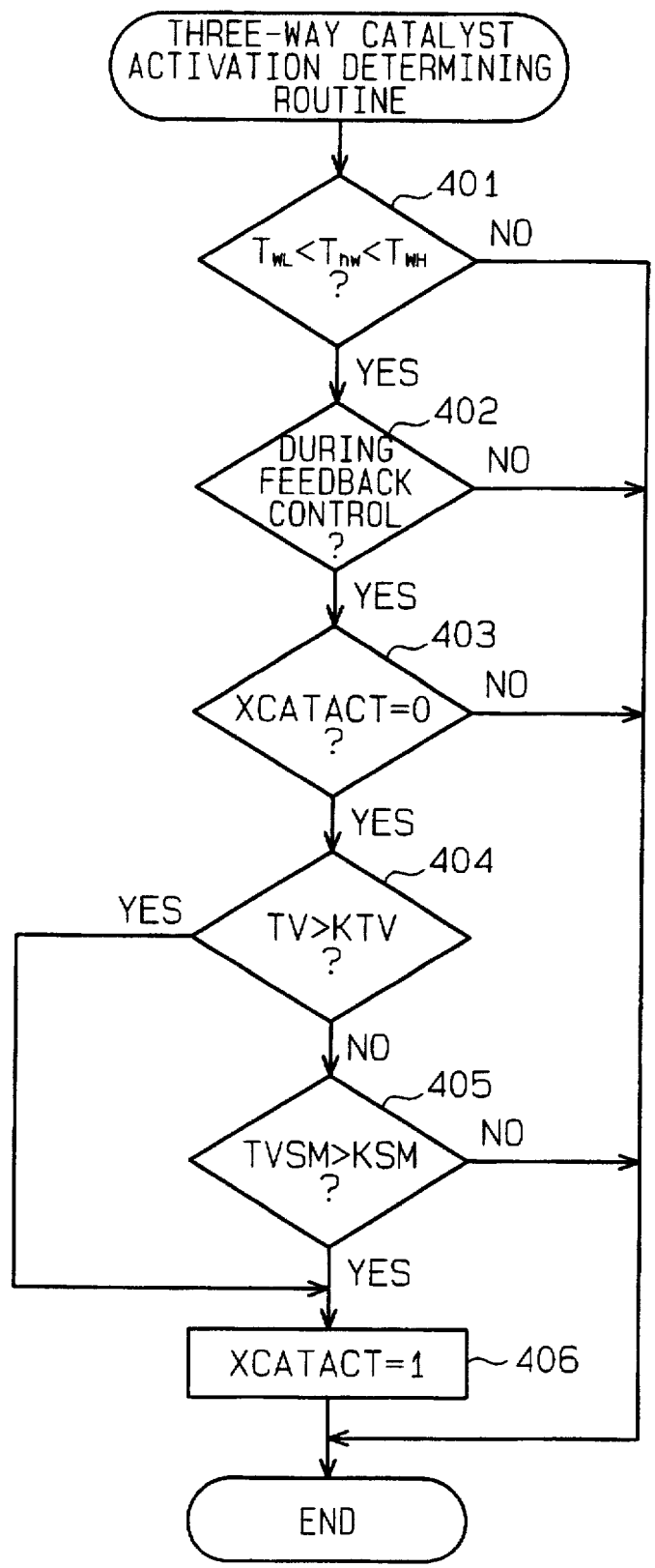
FIG. 5 is a flowchart of a routine for determining activation of the three-way catalytic converter.

In carrying out the routine for determining the activation of the three-way catalytic converter 13 in FIG. 5, the CPU 32 first checks in step 401 to see if the cooling water temperature Thw at the start-up of the engine falls between an allowable low temperature value TWL (30° C. for this embodiment) and an allowable high temperature value TWH (100° C. for this embodiment) (i.e., a check is made to see if TWL<Thw<TWH). If it is found that TWL<Thw<TWH, then step 402 is reached. In step 402, the CPU 32 checks to see if air-fuel ratio feedback control is being executed by the routine of FIG. 2. If the routine is found to be in execution, step 403 is reached. In step 403, the CPU 32 checks to see if the catalyst activation flag XCATACT is cleared to "0," i.e., if the activation of the three-way catalytic converter 13 has yet to be recognized. If XCATACT=0 (activation yet to be recognized), step 404 is reached. If the result of the check in any one of steps 401 through 403 is negative, the CPU 32 terminates this routine immediately at that point.

In step 404, the CPU 32 checks to see if the inverting period TV of the output voltage VOX2 is in excess of a predetermined value KTV. If TV≦KTV, the CPU 32 goes to step 405; if TV>KTV, the CPU 32 proceeds to step 406. In step 405, the CPU 32 checks to see if the averaged value TVSM of the inverting period TV is in excess of a predetermined reference value KSM. If TVSM≦KSM, the CPU 32 terminates this routine immediately. If TVSM>KSM, the CPU 32 proceeds to step 406.

In step 406, the CPU 32 sets the catalyst activation flag XCATACT to "1" and terminates this routine. That is, if the three-way catalytic converter 13 has yet to be activated (before the time t4 in FIG. 10E), the output voltage VOX2 of the downstream O2 sensor 27 follows the upstream air-fuel ratio λ without delay. At this time, the inverting period and its averaged value TVSM do not exceed the reference values KTV and KSM in steps 404 and 405. But after the three-way catalytic converter 13 is activated (after the time t4 in FIG. 10B), the output voltage VOX2 of the downstream O2 sensor 27 is not inverted between the rich and the lean state. This causes the inverting period TV and its averaged value TVSM to exceed the reference values KTV and KSM in steps 404 and 405. Thus the result of the check in either step 404 or step 405 is found to be affirmative, the activation of the three-way catalytic converter 13 is recognized, and the catalyst activation flag XCATACT is set accordingly.

Figure 6:
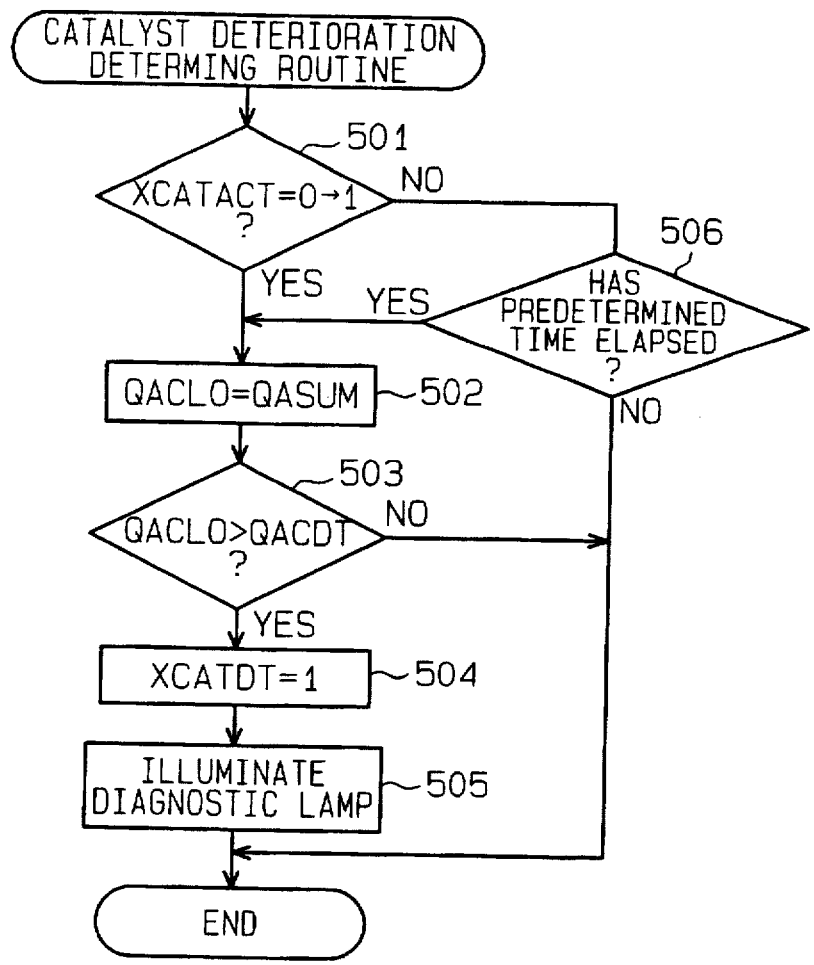
FIG. 6 is a flowchart of a routine for determining the deterioration of the three-way catalytic converter.
Figure 7:
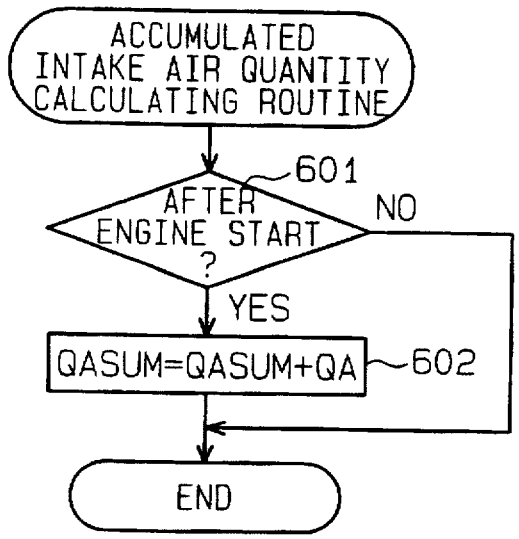
FIG. 7 is a flowchart of an accumulated intake air quantity calculating routine.

In carrying out the routine for determining the deterioration of the three-way catalytic converter 13 in FIG. 6, the CPU 32 first checks in step 501 to see if the catalyst activation flag XCATACT has changed from "0" to "1." If the flag is found to have changed from "0" to "1," step 502 is reached. In step 502, the CPU 32 sets the accumulated intake air quantity QASUM to "QACLO" and stores it. The accumulated intake air quantity QASUM is an accumulation of the intake air quantity QA calculated since the start-up of the engine. The calculation is performed by an accumulated intake air quantity calculating routine shown in FIG. 7. In carrying out the routine of FIG. 7, the CPU 32 checks in step 601 to see if the engine is started illustratively by turning on the ignition key. If the engine is found to be started (ignition key=ON), step 602 is reached. In step 602, the CPU 32 updates the accumulated intake air quantity QASUM by adding to the current quantity QASUM the intake air quantity QA calculated on the basis of the readings from the air flow meter 28. Although the first embodiment calculates the intake air quantity QA based on the readings of the air flow meter 28, this is not limitative of the invention. Alternatively, the intake air quantity QA may be estimated from the intake air pressure PM detected by the intake air pressure sensor and from the engine rotational speed Ne measured by the rotational speed sensor 25. The accumulated intake air quantity QASUM is initialized to "0" at the start-up of the engine.

With the accumulated intake air quantity QASUM stored in step 502, the CPU 32 goes to step 503 in which a check is made to see if the value "QACLO" exceeds a predetermined deterioration reference value QACDT. If QACLO≦QACDT, the CPU 32 terminates this routine immediately. If QACLO>QACDT, the CPU 32 enters step 504 in which the catalyst deterioration flag XCATDT is set to "1." In step 505, the CPU 32 stores the deterioration information into the backup RAM 35 and executes a predetermined diagnostic process (e.g., illumination of the diagnostic lamp 29).

If the result of the check in step 501 is negative, the CPU 32 enters step 506. In step 506, a check is made to see if a predetermined time (e.g., 5 seconds) has elapsed since the start-up of the engine (i.e., starting from the warm-up of the three-way catalytic converter 13). As the deterioration of the three-way catalytic converter 13 progresses, the activation of the catalyst is delayed accordingly. It then takes significantly more time to make a determination of catalyst activation. Therefore, the three-way catalytic converter 13 is assumed to be activated when the predetermined time has elapsed since the start-up of the engine, and the deterioration determining process after step 502 is carried out.

Figure 8:
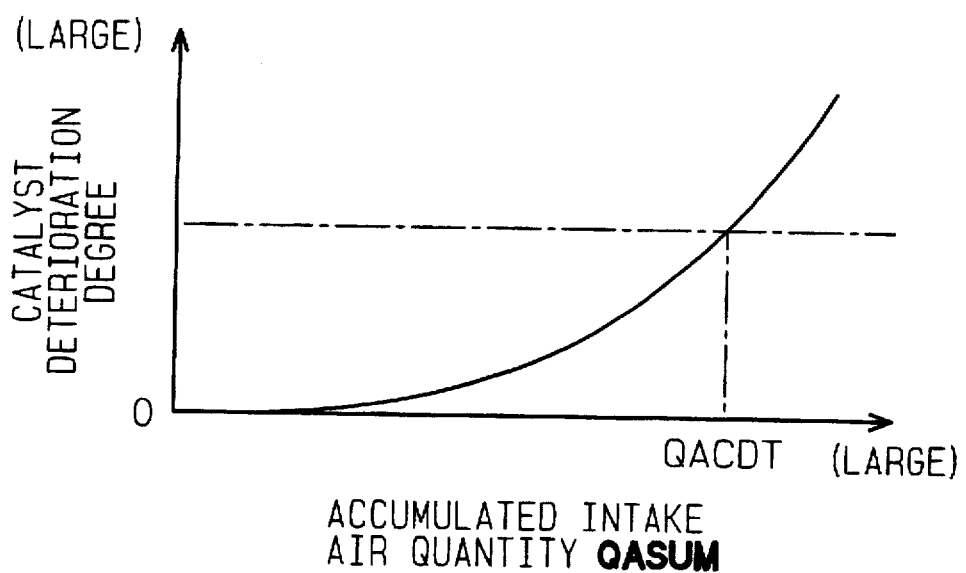
FIG. 8 is a graphic representation showing a typical relationship between an accumulated intake air quantity and a deterioration of the three-way catalytic converter.
Figure 9:
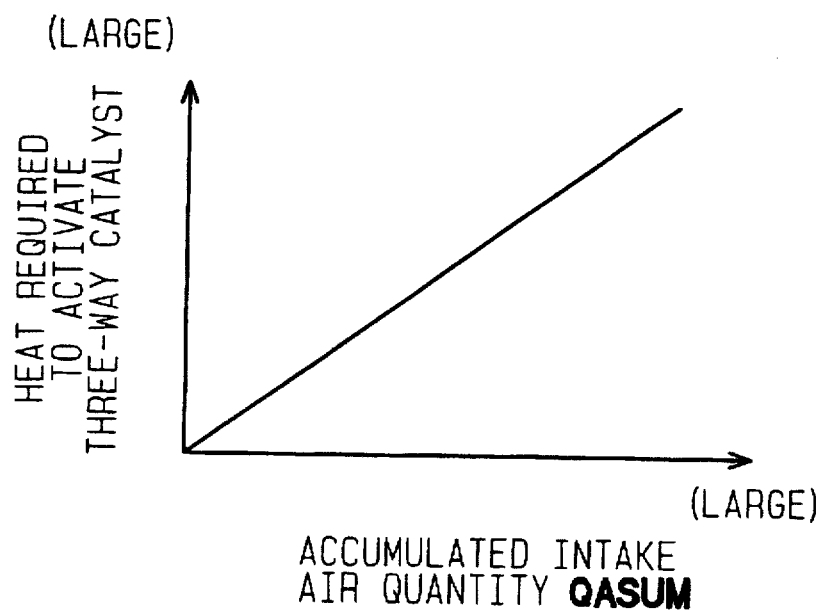
FIG. 9 is a graphic representation depicting a typical relationship between a quantity of heat required to activate the three-way catalytic converter and accumulated intake air quantity.
Figure 10:
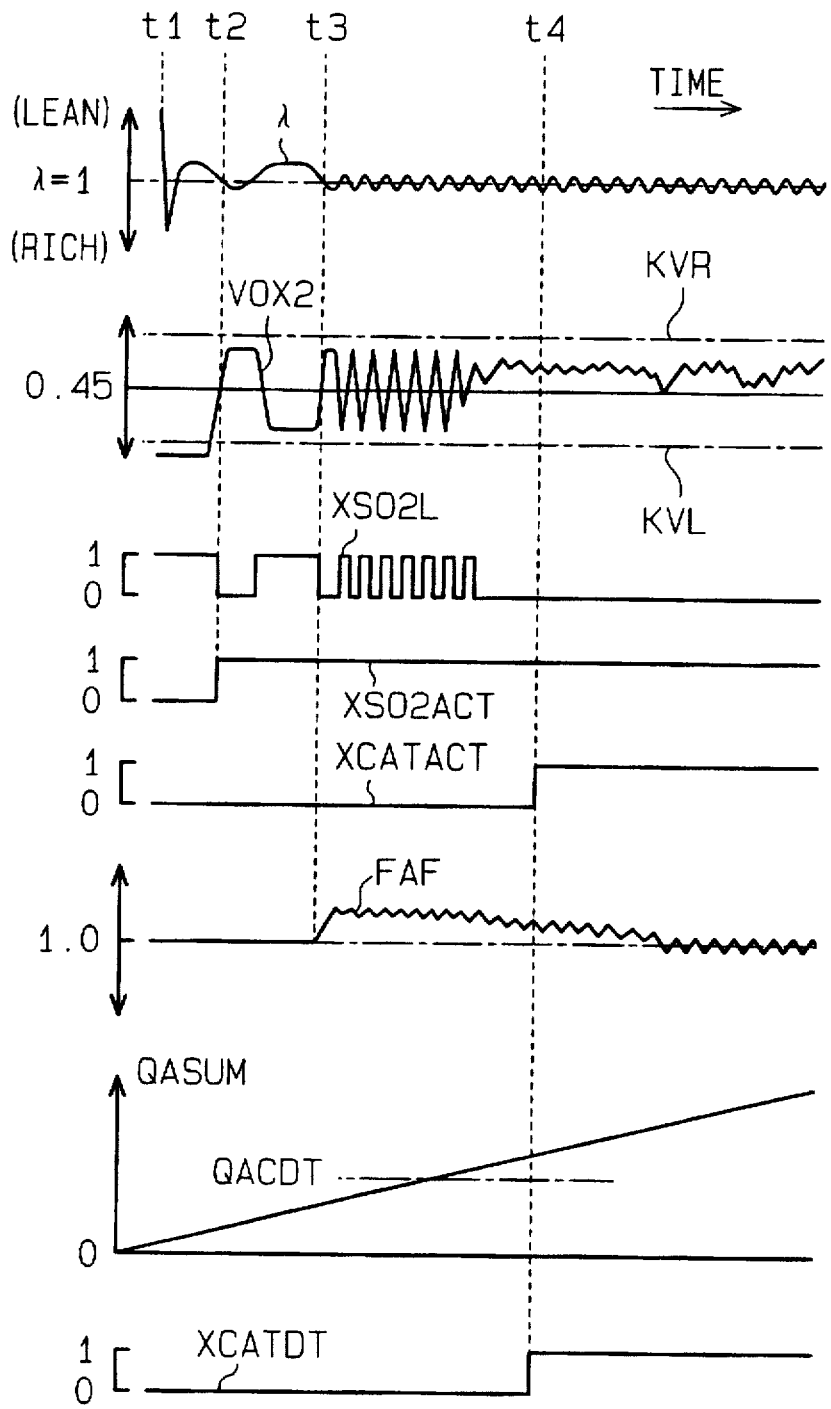
FIGS. 10A–10H are timing chartss for explaining typical operations upon start-up of the engine.

There exists a relationship shown in FIG. 8 between the accumulated intake air quantity QASUM and the degree of deterioration of the three-way catalytic converter 13. The deterioration reference value QACDT is set in accordance with a reference determination level (the broken line level illustrated) in FIG. 8. As shown in FIG. 8, the greater the intake air quantity (accumulated intake air quantity QASUM) required to activate the three-way catalytic converter 13 (up to completion of its warm-up), the higher the degree of deterioration in the converter 13. More specifically, as the deterioration of the three-way catalytic converter 13 progresses, the resulting decrease in the reaction heat generated by the converter 13 delays catalyst activation (warm-up) and increases the quantity of heat required to activate the converter 13. Because the quantity of heat for activating the converter 13 is substantially proportionate to the accumulated intake air quantity QASUM, as depicted in FIG. 9, catalyst deterioration may be determined by use of the accumulated intake air quantity QASUM when the three-way catalyst converter 13 is activated (at the time t4 in FIGS. 10G and 10H).

A large quantity of emissions is discharged before the activation of the three-way catalytic converter 13. As in the case of the degree of deterioration in the three-way catalytic converter 13, the degree of increase in emissions corresponds to the quantity of heat required for catalyst activation. Thus the determination of the deterioration of the three-way catalytic converter 13 based on the accumulated intake air quantity QASUM suitably reflects the degree of increase in emissions from the start-up of the engine until the activation of the three-way catalytic converter 13.

The first embodiment described above provides the following effects: The first embodiment first calculates as the accumulated intake air quantity (QASUM) the quantity of heat required from the start-up of the engine until the activation of the three-way catalytic converter 13. Using the accumulated intake air quantity QASUM thus calculated, the first embodiment checks the three-way catalytic converter 13 for deterioration. This scheme makes it possible to determine both the degree of increase in emissions and the deteriorating state of the three-way catalytic converter 13 with accuracy.

With the downstream O2 sensor 27 activated, the first embodiment determines the activation of the three-way catalytic converter 13 on the basis of the inverting period of the downstream air-fuel ratio furnished by the sensor 27. That is, the upstream air-fuel ratio is inverted between the rich and the lean state under air-fuel ratio feedback control with respect to the target air-fuel ratio (stoichiometric air-fuel ratio). By contrast, the downstream air-fuel ratio responds without delay to the behavior of the upstream air-fuel ratio before the activation of the three-way catalytic converter 13. After catalyst activation, the oxygen storage volume of the three-way catalytic converter 13 reduces the responsiveness of the downstream sensor output and prolongs the inverting period of the downstream air-fuel ratio. Thus checking the inverting period of the downstream O2 sensor 27 allows the activation of the three-way catalytic converter 13 to be detected accurately. In this setup, the heater 27a attached to the downstream O2 sensor 27 promotes the activation of the latter, so that the activation of the catalyst is determined more accurately than ever.

(Second Embodiment)

Figure 11:
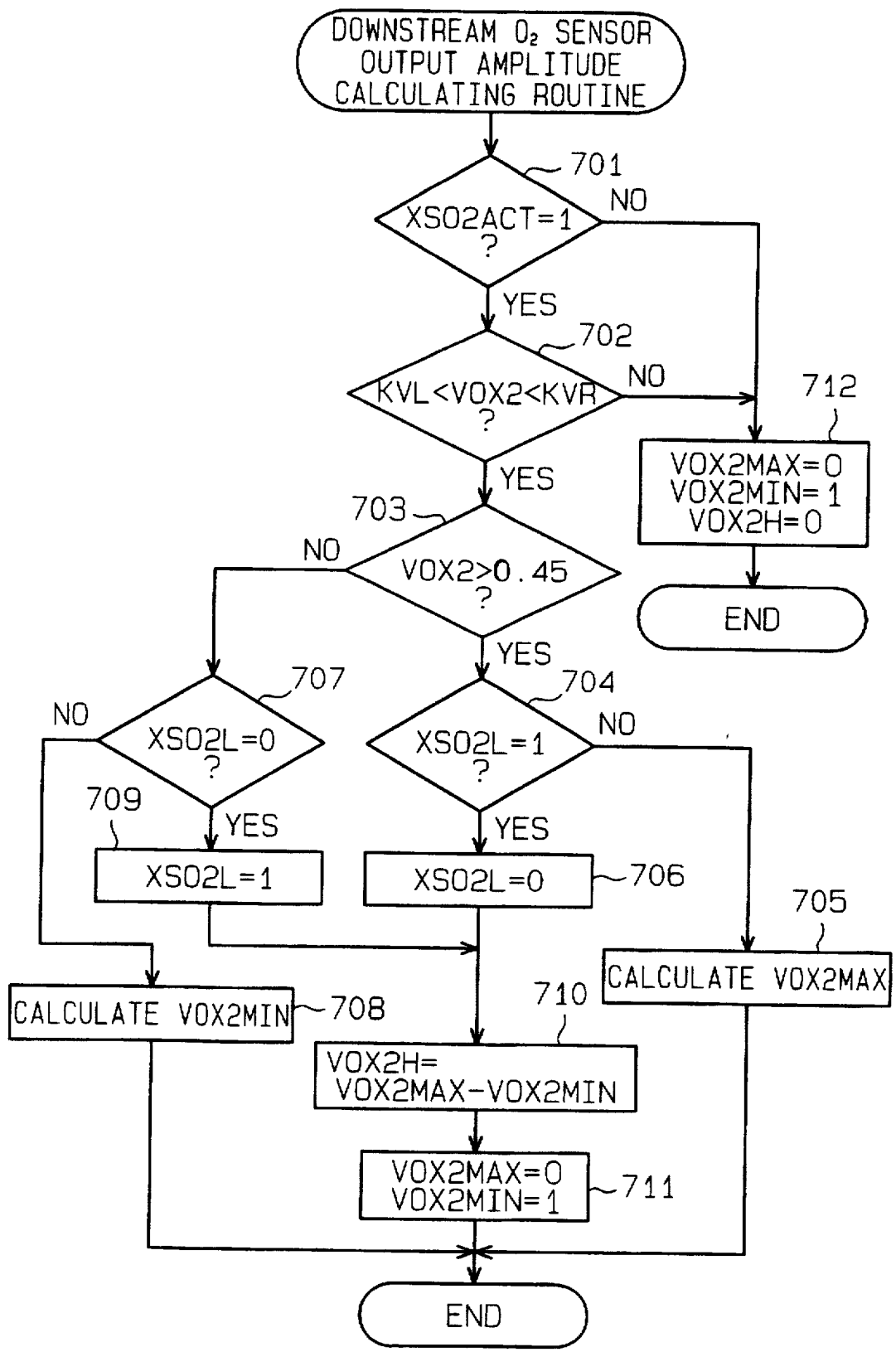
FIG. 11 is a flowchart of a routine for calculating the amplitude of the output from the downstream O2 sensor in a second embodiment.
Figure 12:
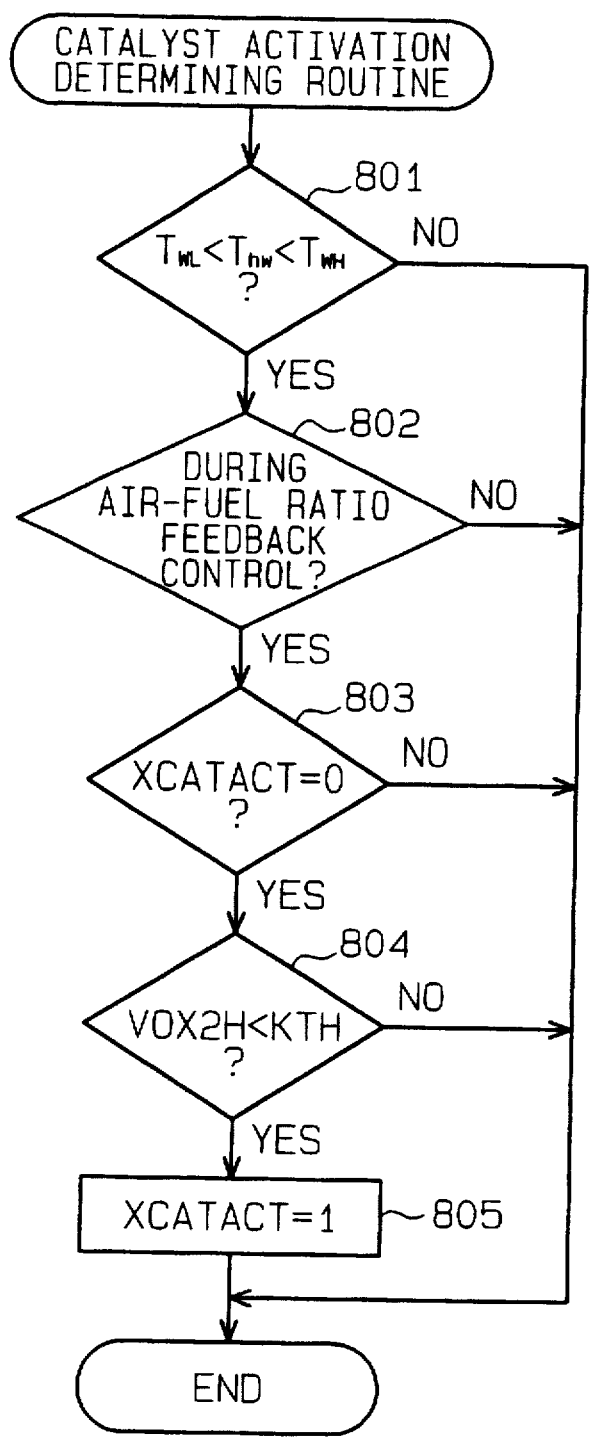
FIG. 12 is a flowchart of a routine for determining activation of the catalyst in the second embodiment.

What follows is a description dealing primarily with the differences between the first and the second embodiment of the invention. As shown in FIGS. 11 and 12, the second embodiment modifies the routine for determining the activation of the three-way catalytic converter 13. As described above, when the three-way catalytic converter 13 is activated, the oxygen storage volume of the catalyst lowers the responsiveness of the downstream O2 sensor 27 and reduces the amplitude of its output signals. Thus in the second embodiment, the amplitude of the output from the downstream O2 sensor 27 is used as the basis for determining the activation of the three-way catalytic converter 13. FIG. 11 shows the routine for calculating the amplitude of the output from the downstream O2 sensor 27, and FIG. 12 depicts the modified catalyst activation determining routine. The flowcharts in FIGS. 11 and 12 are prepared by partially modifying those in FIGS. 4 and 5 for the first embodiment. The steps common to the two embodiments will be discussed only briefly.

In carrying out the routine for calculating the amplitude of the output from the downstream O2 sensor 27 in FIG. 11, the CPU 32 first checks in step 701 to see if the downstream O2 sensor 27 is activated (XSO2ACT=1), and ascertains in step 702 if the output voltage VOX2 of the sensor 27 falls within an allowable range (KVL<VOX2<KVR). If the results of the checks in steps 701 and 702 are both affirmative, the CPU 32 goes to step 703.

In steps 703 and 704, the CPU 32 checks to see if the downstream air-fuel ratio is inverted from the lean state in the preceding process to a rich state in the current process. If the inversion has not taken place, the CPU 32 goes through steps 703, 704 and 705, in that order, to update the maximum value of the output voltage VOX2 (VOX2MAX; rich peak). In steps 703 and 707, the CPU 32 checks to see if the downstream air-fuel ratio is inverted from the rich state in the preceding process to a lean state in the current process. If the inversion has not taken place, the CPU 32 goes through steps 703, 707 and 708, in that order, to update the minimum value of the output voltage VOX2 (VOX2MIN; lean peak).

If the inversion of the downstream air-fuel ratio is found to have taken place (affirmative result in either step 704 or step 707), the CPU 32 passes through step 706 or 709 to reach step 710. In step 710, the CPU 32 calculates the amplitude VOX2H of the output voltage VOX2 (VOX2H= VOX2MAX−VOX2MIN). In step 711, the CPU 32 resets VOX2MAX to "0" and VOX2MIN to "1" (volt), and terminates this routine.

If the result of the check in either step 701 or 702 is negative, the CPU 32 goes to step 712. In step 712, the CPU 32 resets VOX2MAX to "0," VOX2MIN to "1" (volt) and VOX2H to "0," and terminates this routine.

In carrying out the routine for determining the activation of the three-way catalytic converter 13 in FIG. 12, the CPU 32 first checks in step 801 to see if the cooling water temperature Thw falls within a predetermined allowable range (i.e., between TWL and TWH). In step 802, the CPU 32 checks to see if air-fuel ratio feedback control is being executed. In step 803, a check is made to see if the three-way catalytic converter 13 is already activated (i.e., if catalyst activation flag XCATACT=0). If any one of these preconditions is not met, the CPU 32 terminates this routine immediately.

When all the preconditions above are found to be met, the CPU 32 enters step 804 in which a check is made to see if the amplitude VOX2H of the output voltage VOX2 is less than a predetermined activation reference value KTH. If VOX2H≧KTH, the CPU 32 considers the three-way catalytic converter 13 still inactive and terminates this routine. If VOX2H<KTH, the CPU 32 considers the three-way catalytic converter 13 activated and proceeds to step 805. In step 805, the CPU 32 sets the catalyst activation flag XCATACT to "1" and terminates this routine.

That is, before the three-way catalytic converter 13 is activated, the output voltage VOX2 of the downstream O2 sensor does not converge on a predetermined value and the amplitude VOX2H of the output voltage VOX2 exceeds the reference value KTH. After the three-way catalytic converter 13 is activated (after the time t4 in FIG. 10E), the oxygen storage volume of the catalyst renders the amplitude VOX2H of the output voltage VOX2 from the downstream O2 sensor 27 less than the reference value KTH. Given the affirmative result of the check in step 804, it is possible to determine the activation of the three-way catalytic converter 13 accurately.

The first and second embodiments estimate the quantity of heat required to activate the three-way catalytic converter 13 on the basis of the accumulated intake air quantity calculated since the start-up of the engine. Using the result of the calculation, the first embodiment determines deterioration of the three-way catalytic converter 13. Alternatively, an accumulation of the fuel injection quantity (accumulated fuel injection quantity) from the fuel injection valves may be calculated, and the quantity of heat required to activate the three-way catalytic converter 13 may be estimated on the basis of the accumulated fuel injection quantity thus calculated. That is, the quantity of heat required to activate the three-way catalytic converter 13 is substantially proportionate to the accumulated fuel injection quantity. It is also possible to determine catalyst deterioration using both the accumulated intake air quantity and the accumulated fuel injection quantity. Another alternative is to determine catalyst deterioration based on the period of time required to activate the three-way catalytic converter 13.

The reference level for catalyst deterioration determination (FIG. 6) may be changed on the basis of the warm-up state of the three-way catalytic converter 13 upon starting of the engine. For example, where the internal combustion engine 1 is restarted upon elapse of a short time since the most recent halt of the engine or where the external temperature is significantly high, the three-way catalytic converter 13 is activated with a relatively small quantity of heat. In such a case, the reference level for deterioration determination is preferably changed. More specifically, reference level change is carried out illustratively by: (1) determining the warm-up state of the three-way catalytic converter 13 at the start-up of the engine with respect to the cooling water temperature and outside temperature; or (2) determining the warm-up state of the three-way catalytic converter 13 upon starting of the engine with respect to the outside temperature and the vehicle engine halt period. This allows deterioration determination to be implemented reliably according to the warm-up state obtained at the time of starting the engine.

A catalyst temperature sensor may be additionally provided to detect the temperature of the three-way catalytic converter 13 (i.e., catalyst temperature). The quantity of heat required to activate the three-way catalytic converter 13 may then be computed using the readings from this catalyst temperature sensor. Although the constitution of this variation needs to be supplemented by the additional sensor, the variation permits easy detection of catalyst deterioration.

( Third Embodiment )

A third embodiment of the invention will now be described with reference to FIGS. 13 through 21. The third embodiment diagnoses the state of deterioration of the three-way catalytic converter 13 in two broad categories, i.e., the presence/absence of catalyst deterioration and that of possible catalyst deterioration, at the start-up of the engine and during normal operation. Given the result of the diagnosis, the third embodiment passes a comprehensive deterioration determination more accurately than before.

Figure 13:
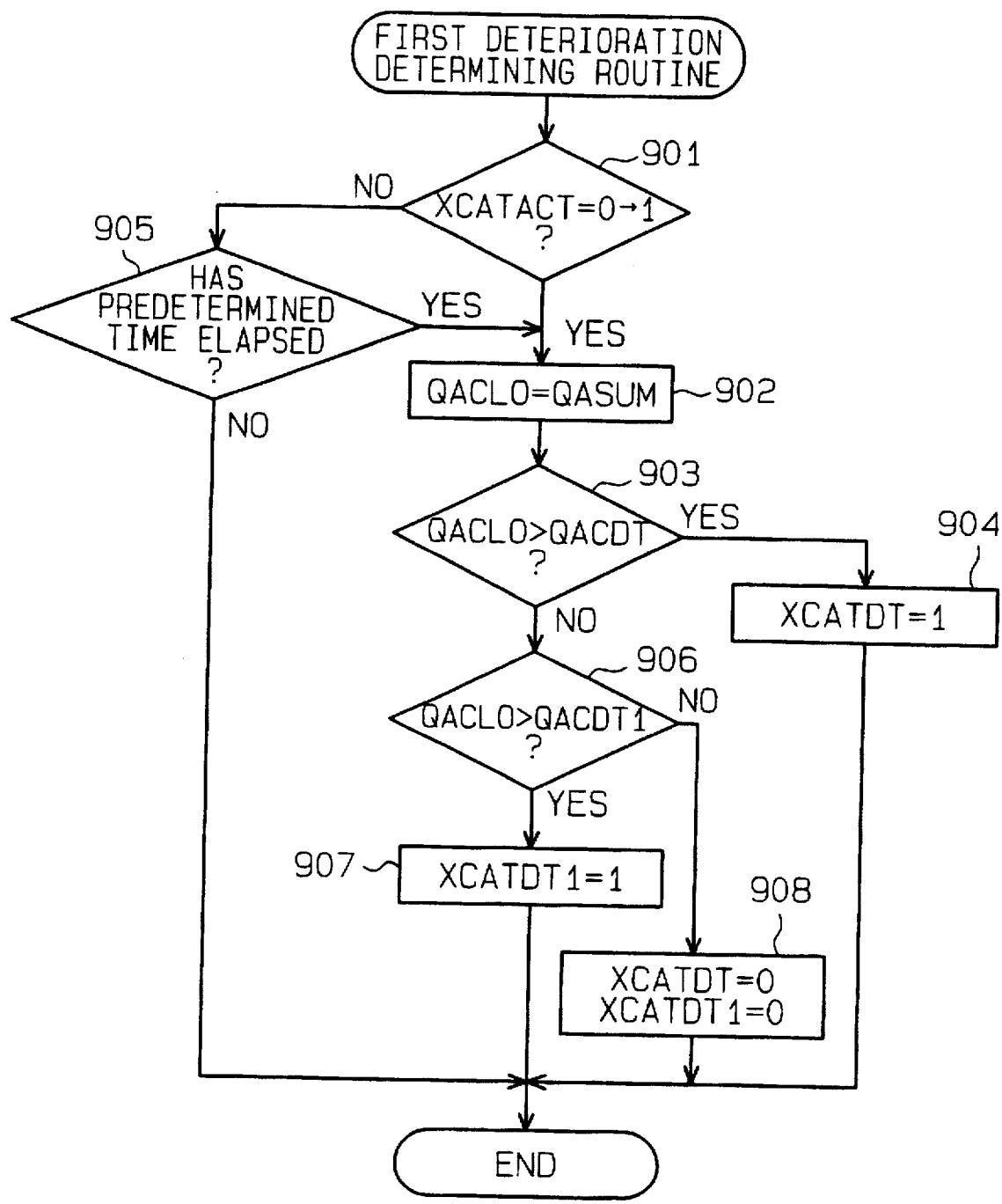
FIG. 13 is a flowchart of a catalyst deterioration first determining routine in a third embodiment.
Figure 15:
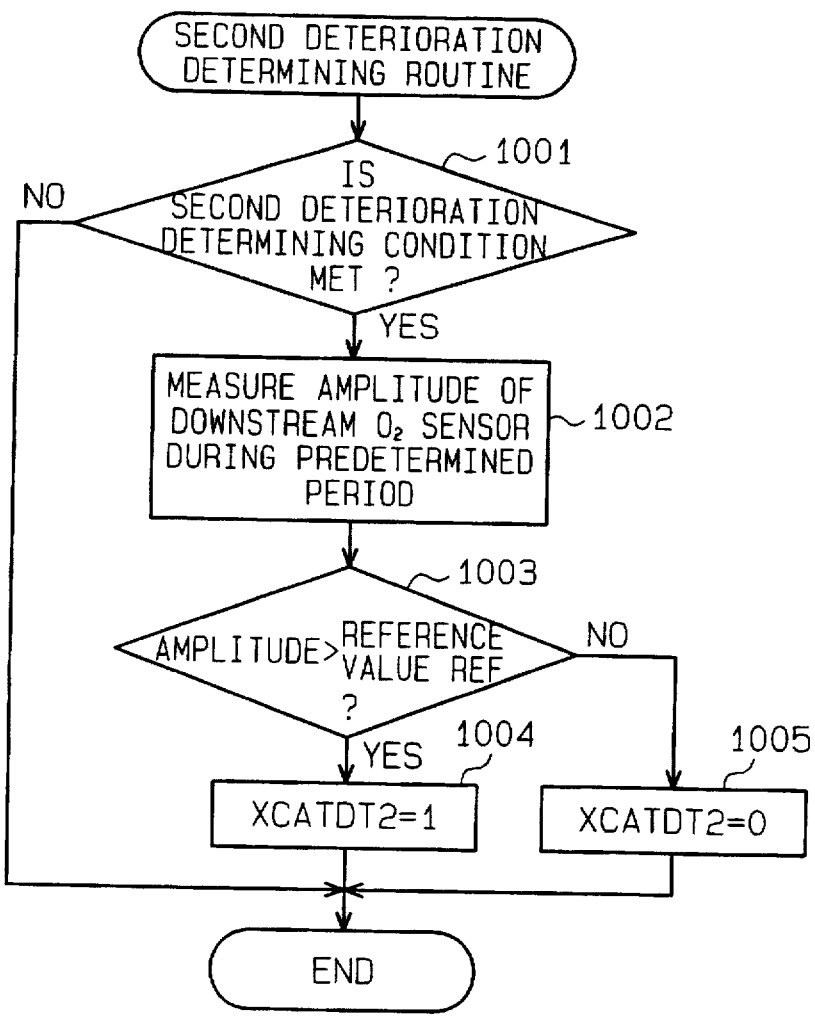
FIG. 15 is a flowchart of a catalyst deterioration second determining routine in the third embodiment.
Figure 17:
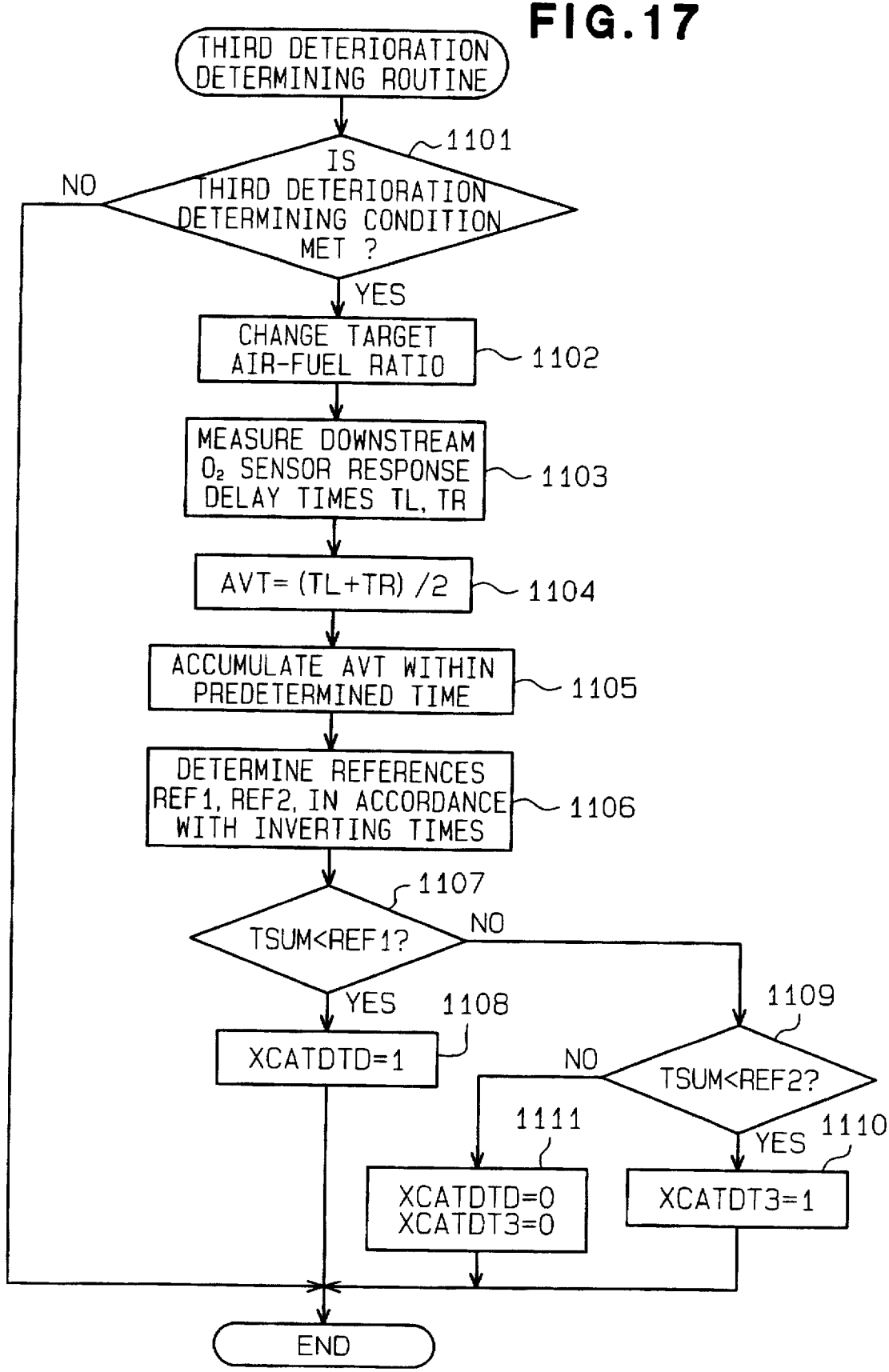
FIG. 17 is a flowchart of a catalyst deterioration third determining routine in the third embodiment.
Figure 21:
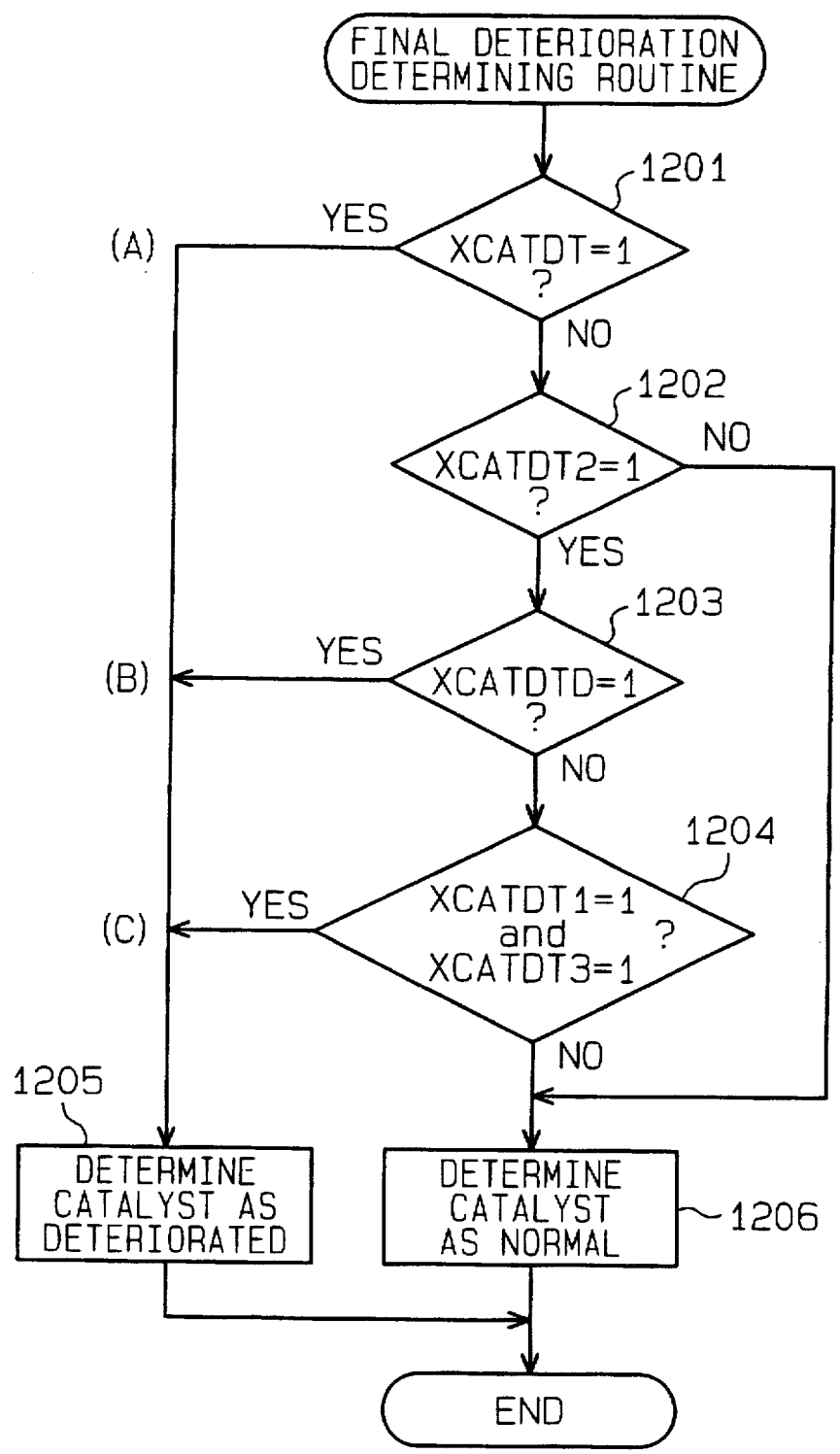
FIG. 21 is a flowchart of a catalyst deterioration final determining routine in the third embodiment.

The third embodiment first carries out a first catalyst deterioration determining routine, a second catalyst deterioration determining routine and a third catalyst deterioration determining routine individually (shown in FIGS. 13, 15 and 17). Given the results of these processes, the third embodiment executes a catalyst deterioration final determining routine (FIG. 21). More specifically, the catalyst deterioration first determining routine (FIG. 13) makes one of three determinations denoting normality, possible deterioration and deterioration on the basis of the quantity of heat required from the start-up of the engine until the activation of the three-way catalytic converter 13. The second and third catalyst deterioration determining routines (FIGS. 15 and 17) make one of three determinations also denoting normality, possible deterioration and deterioration on the basis of the output characteristic (output signal amplitude or responsiveness) of the downstream O2 sensor 27 during normal operation following the warm-up of the engine. The final catalyst deterioration determining routine (FIG. 21) makes a final determination on catalyst deterioration by referring to various flags manipulated by the first catalyst deterioration determining routine through the third catalyst deterioration determining routine indicating the presence/absence of catalyst deterioration or that of possible catalyst deterioration.

The first catalyst deterioration first determining routine will now be described with reference to FIG. 13. In FIG. 13, the CPU 32 first checks in step 901 to see if the catalyst activation flag XCATACT is changed from "0" to "1." If the flag change from "0" to "1" is ascertained, step 902 is reached. In step 902, the CPU 32 sets the accumulated intake air quantity QASUM to "QACLO" and stores it. As mentioned earlier, the accumulated intake air quantity QASUM is an accumulation of the intake air quantity QA calculated since the start-up of the engine by the routine of FIG. 7.

In step 903, the CPU 32 checks to see if the value QACLO exceeds a predetermined deterioration reference value QACDT (first reference value). If QACLO>QACDT, step 904 is reached. In step 904, the catalyst deterioration flag XCATDT indicating the presence/absence of catalyst deterioration is set to "1" (XCATDT=1 indicates the presence of catalyst deterioration). If QACLO≦QACDT, the CPU 32 goes to step 906. In step 906, a check is made to see if the value QACLO exceeds a predetermined deterioration reference value QACDT1 (second reference value; QACDT1<QACDT). If QACLO>QACDT1, step 907 is reached. In step 907, the CPU 32 sets to "1" the catalyst deterioration flag XCATDT1 indicating the presence/absence of possible catalyst deterioration (XCATDT1=1 indicates the presence of possible catalyst deterioration). If QACLO≦QACDT1, the CPU 32 goes to step 908. In step 908, the catalyst deterioration flags XCATDT and XCATDT1 are both cleared to "0."

If the result of the check in step 901 is negative, the CPU 32 goes to step 905. In step 905, the CPU 32 checks to see if a predetermined time (e.g., 5 seconds) has elapsed since the start-up of the engine (i.e., from the beginning of the warm-up of the three-way catalytic converter 13). If the predetermined time is found to have elapsed since the engine start-up, the three-way catalytic converter 13 is considered activated. Then step 902 and the subsequent steps are carried out to proceed with deterioration determination.

Figure 14:
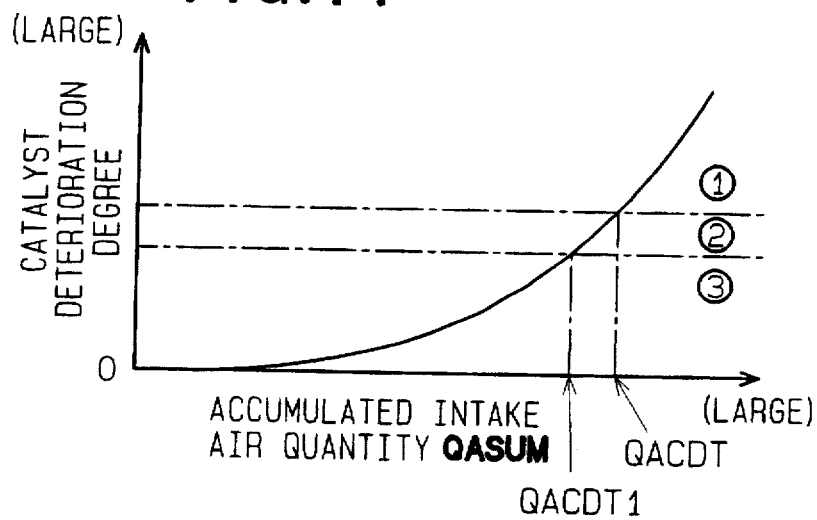
FIG. 14 is a graphic representation illustrating a typical relationship between accumulated intake air quantity and deterioration of the three-way catalytic converter.

In short, the deterioration reference values QACDT and QACDT1 regarding the accumulated intake air quantity QASUM are established as shown in FIG. 14. In FIG. 14, the region numbered (1) is a region indicating complete deterioration of the catalyst; the region numbered (2) is a region denoting the presence of possible catalyst deterioration; and the region numbered (3) is a region showing the absence of catalyst deterioration (i.e., normality). In such cases, the processing routine of FIG. 13 sets XCATDT=1 for the region (1); XCATDT=0 and XCATDT1=1 for the region (2); and XCATDT=0 and XCATDT1=0 for the region (3). The processing routine of FIG. 13 implemented by the CPU 32 corresponds to the first catalyst deterioration determination.

The second catalyst deterioration determining routine will now be described with reference to FIG. 15. In FIG. 15, the CPU 32 first checks in step 1001 to see if a second deterioration determination condition is met. The second deterioration determination condition is considered to be met when the engine has been warmed up, air-fuel ratio feedback control is in effect, and other applicable operations are in order. The CPU 32 goes to step 1002 only if these requirements are met in step 1001. In step 1002, the CPU 32 measures the amplitude of the output signals from the downstream O2 sensor 27. The output signal amplitude corresponds to the difference between the rich peak and the lean peak of the output signals from the downstream O2 sensor 27.

Figure 16:
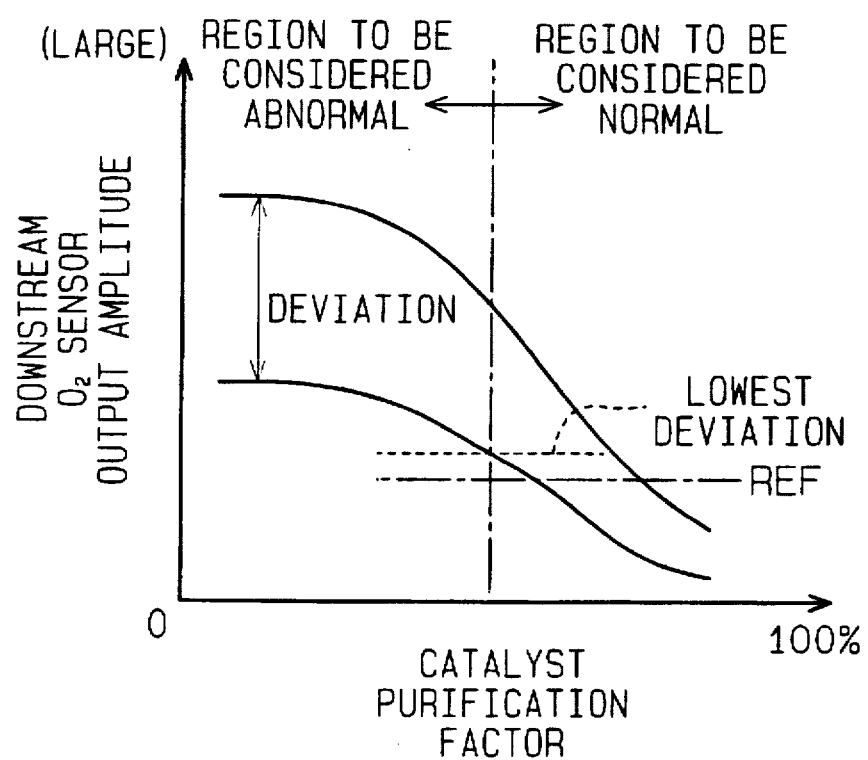
FIG. 16 is a graphic representation showing a typical relationship between amplitude of the output from the downstream O2 sensor and catalyst purification factor.

After amplitude measurement, the CPU 32 proceeds to step 1003 in which a check is made to see if the amplitude of the output signals from the downstream O2 sensor 27 exceeds a predetermined reference value REF. The reference value REF is established so as to permit detection of an obviously normal catalyst (with no possibility of deterioration) upon consideration of the deviations (of amplitude, responsiveness) in the output signals from the downstream O2 sensor 27 as illustrated in FIG. 16. That is, on the boundary between the region considered normal and the region regarded as deteriorated, the three-way catalytic converter 13 is determined to be normal with no possibility (no suspicion) of deterioration as long as the output signal amplitude is below its lowest deviation. The catalyst purification factor represented by the axis of abscissa in FIG. 16 is a parameter indicating the degree of deterioration of the three-way catalytic converter 13. The greater the catalyst purification factor, the lower the presumed degree of catalyst deterioration.

The third embodiment sets the reference value REF below the lowest amplitude deviation. If the amplitude is found to be greater than the reference value REF in step 1003 of FIG. 15, the CPU 32 recognizes possible deterioration of the catalyst and goes to step 1004. In step 1004, the CPU 32 sets to "1" the catalyst deterioration flag XCATDT2 indicating the presence/absence of possible catalyst deterioration (XCATDT2=1 indicates possible deterioration of the catalyst). If the amplitude is found to be equal to or less than the reference value REF, the CPU 32 determines that the catalyst is obviously normal, and proceeds to step 1005. In step 1005, the catalyst deterioration flag XATDT2 is cleared to "0." After operating on the catalyst deterioration flag XCATDT2, the CPU 32 terminates this routine. The processing routine of FIG. 15 implemented by the CPU 32 corresponds to the amplitude detecting means and the second catalyst deterioration determining means (amplitude deterioration determining means).

The third catalyst deterioration determining routine will now be described with reference to FIG. 17. In FIG. 17, the CPU 32 first checks in step 1101 to see if a third deterioration determination condition is met. The third deterioration determination condition is considered to be met when the catalyst deterioration flag XCATDT2 is set to "1" by the above-described routine of FIG. 15 indicating possible deterioration of the catalyst, air-fuel ratio feedback control is in effect, and other applicable operations are in order. The CPU 32 goes to step 1102 only if these requirements are met in step 1101. In step 1102, the CPU 32 changes the target air-fuel ratio. At this point, as shown in FIGS. 18A and 18B, the target air-fuel ratio is inverted from the lean state to the rich state or vice versa, the two states being ±2% apart with respect to $\lambda=1$.

In step 1103, the CPU 32 measures response delay times TL and TR of the downstream O2 sensor 27. The time TL is a period of time that elapses from the time the target air-fuel ratio is inverted from the rich state to the lean state until the output signal from the downstream O2 sensor 27 proceeds to a predetermined voltage (0.45 V; the time TL is called the lean delay time hereinafter). The time TR is a period of time that elapses from the time the target air-fuel ratio is inverted from the lean state to the rich state until the output signal from the downstream O2 sensor 27 proceeds to the predetermined voltage (0.45 V; the time TR is called the rich delay time hereinafter).

In step 1104, the CPU 32 calculates the average value AVT of the lean and rich delay times TL and TR (AVT= (TL+TR)/2). In step 1105, the CPU 32 accumulates the average value AVT within a predetermined period of time to obtain an accumulated delay time TSUM. The average value AVT of the lean and rich delay times TL and TR is calculated here because of the need to prevent an overflow of an accumulation counter. It follows that if the counter has sufficient counting capacity, the averaging process of step 1104 may be omitted. Where the lean and rich delay times TL and TR need not be averaged, the routine proceeds more quickly.

In step 1106, the CPU 32 determines a first deterioration reference value REF1 and a second deterioration reference value REF2 in accordance with the number of times the target air-fuel ratio is inverted. More specifically, the CPU 32 counts the number of times the target air-fuel ratio is inverted while the average delay time AVT is being accumulated, and refers to a table shown in FIG. 19 to find the first deterioration reference value REF1. The second deterioration reference value REF2 is obtained by multiplying the value REF1 by $\alpha$ ($\alpha<1.0$). Alternatively, the deterioration reference values REF1 and REF2 may both be set in tables (provided REF1<REF2). These measures allow optimum deterioration reference values REF1 and REF2 to be set in keeping with the number of times the lean and rich delay times TL and TR are accumulated.

In step 1107, the CPU 32 checks to see if the accumulated delay time TSUM is less than the first deterioration reference value REF1 (TSUM<REF1). If it is found that TSUM<REF1, step 1108 is reached. In step 1108, the CPU 32 sets to "1" the catalyst deterioration flag XCATDTD indicating the presence/absence of catalyst deterioration (XCATDTD=1 indicates the presence of catalyst deterioration).

If TSUM$\geq$REF1 in step 1107, the CPU 32 goes to step 1109. In step 1109, a check is made to see if the accumulated delay time TSUM is less than the second deterioration reference value REF2 (TSUM<REF2). If it is found that TSUM<REF2, the CPU 32 proceeds to step 1110. In step 1110, the CPU 32 sets to "1" the catalyst deterioration flag XCATDT3 indicating the presence/absence of possible catalyst deterioration (XCATDT3=1 indicates the presence of possible catalyst deterioration). If TSUM$\geq$REF2 in step 1109, step 1111 is reached. In step 1111, the CPU 32 clears the catalyst deterioration flags XCATDTD and XCATDT3 both to "0."

Figure 20:
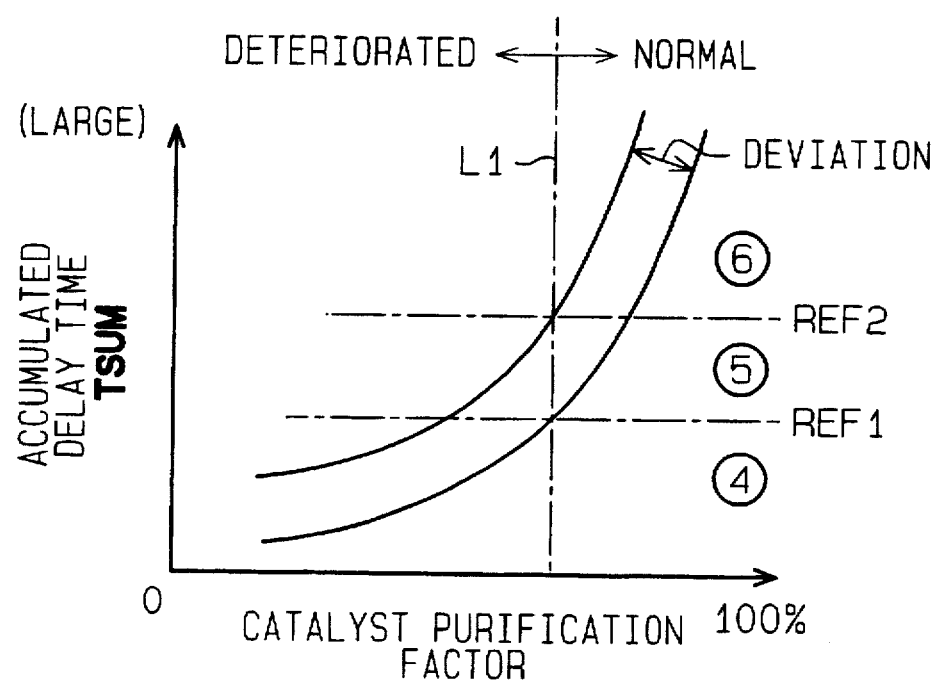
FIG. 20 is a graphic representation showing a typical relationship between accumulated delay time and catalyst purification factor.

That is, the deterioration reference values REF1 and REF2 for the accumulated delay time TSUM are set as shown in FIG. 20. In FIG. 20, a boundary L1 separates the region considered normal from the region regarded as deteriorated. In this case, the accumulated delay time TSUM has deviations as illustrated. Thus the region numbered (4) in FIG. 20 is a region indicating complete deterioration of the catalyst; the region numbered (5) is a region denoting the presence of possible catalyst deterioration; and the region numbered (6) is a region showing the absence of catalyst deterioration (i.e., normality). The processing routine of FIG. 17 sets XCATDTD=1 and XCATDT3=0 for the region (4) (TSUM<REF1); XCATDTD=0 and XCATDT3=0 for the region (5) (REF1$\leq$TSUM<REF2); and XCATDTD=0 and XCATDT3=0 for the region (6) (TSUM$\geq$REF2). The processing routine of FIG. 17 implemented by the CPU 32 corresponds to the target air-fuel ratio inverting means, response delay time measuring means, and catalyst deterioration second determining means (response time deterioration determining means).

The final catalyst deterioration determining routine will now be described with reference to the flowchart of FIG. 21. In steps 1201 through 1204 of FIG. 21, the CPU 32 determines the flags manipulated by the first catalyst deterioration determining routine through the third catalyst deterioration determining routine described above. More specifically, the CPU 32 checks in step 1201 to see if the catalyst deterioration flag XCATDT is "1." In step 1202, the CPU 32 checks to see if the catalyst deterioration flag XCATDT2 is "1." In step 1203, a check is made to see if the catalyst deterioration flag XCATDTD is "1." In step 1204, a check is made to see if the catalyst deterioration flags XCATDT1 and XCATDT3 are both "1."

If any one of the following three cases (A), (B) and (C) holds, the CPU 32 proceeds to step 1205 to make a final determination denoting the deterioration of the three-way catalytic converter 13:

- (A) When XCATDT=1, i.e., when the first catalyst deterioration determining routine finds that the quantity of heat required up to catalyst activation (i.e., accumulated intake air quantity QASUM) exceeds the deterioration reference value QACDT by which to determine complete deterioration of the catalyst ("YES" in step 903 of FIG. 13).
- (B) When XCATDT2=1 and XCATDTD=1, i.e., when the second catalyst deterioration second determining routine finds that the amplitude of output signals from the downstream O2 sensor 27 under air-fuel ratio feedback control exceeds the reference value REF by which to determine possible deterioration of the catalyst ("YES" in step 1003 of FIG. 15), and when the third catalyst deterioration determining routine finds that the response delay time (accumulated delay time TSUM) of the downstream O2 sensor 27 is less than the deterioration reference value REF1 by which to determine complete deterioration of the catalyst ("YES" in step 1107 of FIG. 17).
- (C) When XCATDT2=1, XCATDT1=1 and XCATDT3=1, i.e., when the first catalyst deterioration determining routine finds that the quantity of heat required up to catalyst activation (accumulated intake air quantity QASUM) exceeds the deterioration reference value QACDT1 by which to determine possible deterioration of the catalyst ("YES" in step 906 of FIG. 13); when the second catalyst deterioration determining routine finds that the amplitude of output signals from the downstream O2 sensor 27 under air-fuel ratio feedback control exceeds the reference value REF by which to determine possible deterioration of the catalyst ("YES" in step 1003 of FIG. 15); and when the third catalyst deterioration determining routine finds that the response delay time (accumulated delay time TSUM) of the downstream O2 sensor 27 is less than the deterioration reference value REF2 by which to determine possible deterioration of the catalyst ("YES" in step 1109 of FIG. 17).

If none of the cases (A) through (B) above holds, the CPU 32 goes to step 1206. In step 1206, the CPU 32 makes the final determination that the three-way catalytic converter 13 is normal. The processing routine implemented by the CPU 32 corresponds to the catalyst deterioration final determining means.

The third embodiment of the invention provides the following effects: When catalyst deterioration is determined according to the quantity of heat required up to catalyst activation (i.e., the determining routine of FIG. 13), symptoms of the deterioration may be relatively inconspicuous upon determination but may become more pronounced later during normal operation (e.g., where the catalyst is rapidly cooled after catalyst deterioration). By contrast, the third embodiment first stores less conspicuous symptoms of the deterioration as "possible deterioration" and later makes the final determination on "the presence/absence of deterioration." In this manner, the deterioration of the three-way catalytic converter 13 is always assessed accurately.

In addition, the third embodiment takes into account the deviations in the behavior of output signals from the downstream O2 sensor 27, and determines possible deterioration of the catalyst according to these signal behavior deviations. This makes it possible to determine possible catalyst deterioration properly and to obtain the final determination with high reliability.

(Fourth Embodiment)

A fourth embodiment of the invention which is a modification, shown in FIG. 22, of the catalyst deterioration second determining routine (FIG. 15) of the third embodiment described above will be described. In the fourth embodiment, the CPU 32 sets an air-fuel ratio correction coefficient in accordance with the deviation between the air-fuel ratio detected by the downstream O2 sensor 27 and the target air-fuel ratio (this correction coefficient is abbreviated to the sub-FAF). The sub-FAF is used as the basis for correcting fuel injection control. In implementing the fourth embodiment, the CPU 32 constitutes the auxiliary air-fuel ratio control means and the second catalyst deterioration determining means (inverting period deterioration determining means).

Figure 22:
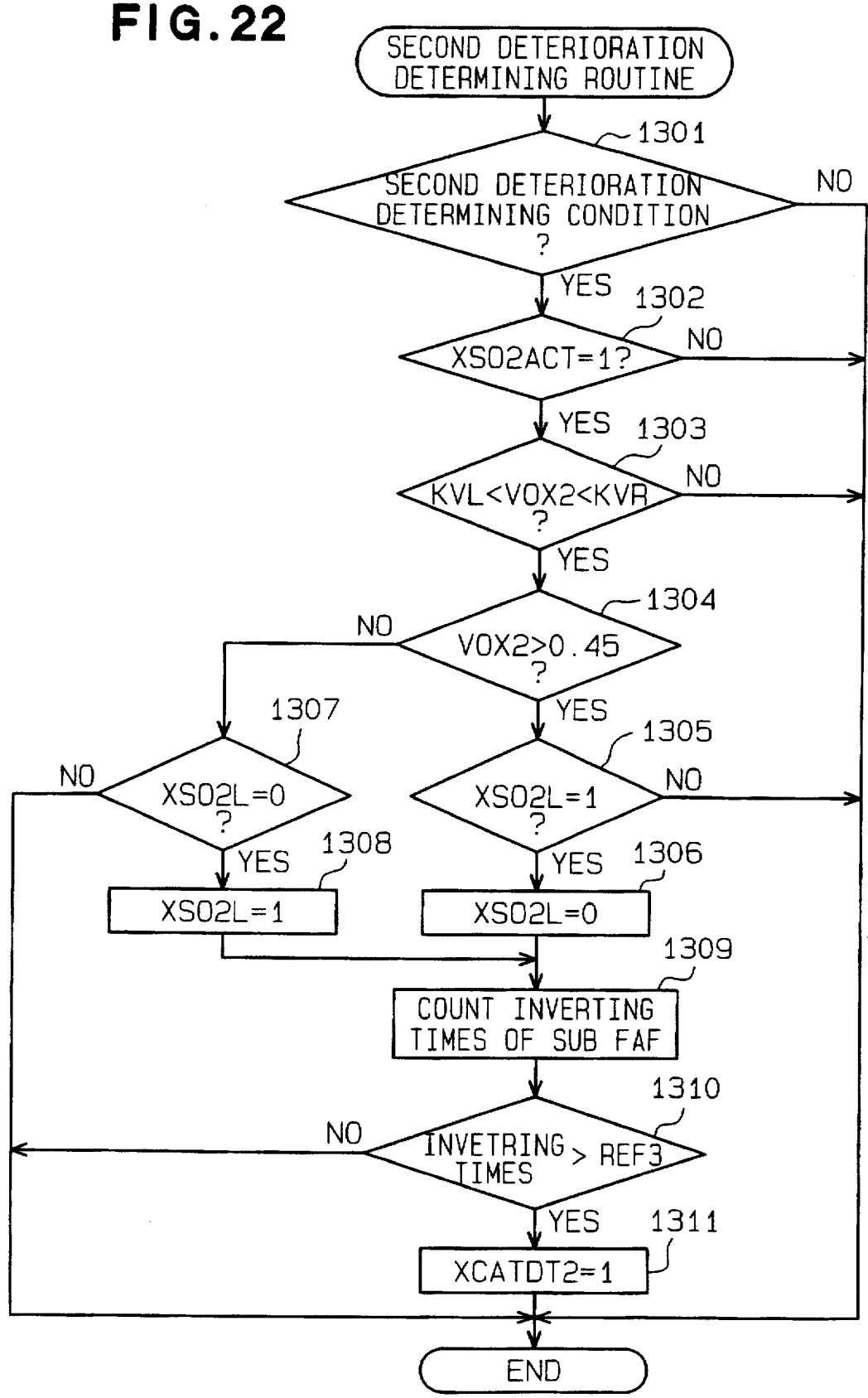
FIG. 22 is a flowchart of a catalyst deterioration second determining routine in a fourth embodiment.

In carrying out the second catalyst deterioration determining routine of FIG. 22, the CPU 32 first checks in step 1301 to see if the second deterioration determination condition is met (the same as step 1001 of FIG. 15). In step 1302, the CPU 32 checks to see if the downstream O2 sensor 27 is activated (XSO2ACT=1). In step 1303, a check is made to see if the output voltage VOX2 of the downstream O2 sensor 27 falls within the predetermined allowable range (KVL<VOX2KVR). If all of these preconditions are met, the CPU 32 goes to step 1304.

In steps 1304 and 1305, the CPU 32 checks to see if the downstream air-fuel ratio is inverted from the lean state of the preceding process to a rich state in the current process. If the lean-to-rich inversion is found to have taken place, the CPU 32 proceeds through steps 1304, 1305, 1306 and 1309, in that order. In steps 1304 and 1307, the CPU 32 checks to see if the downstream air-fuel ratio is inverted from the rich state of the preceding process to a lean state in the current process. If the rich-to-lean inversion is found to have occurred, the CPU 32 proceeds through steps 1304, 1307, 1308 and 1309, in that order.

In step 1309, the CPU 32 counts the number of times the sub-FAF is inverted within a predetermined period of time. In step 1310, a check is made to see if the inversion count exceeds a predetermined deterioration reference value REF3. That is, where the three-way catalytic converter 13 is normal, the behavior of the sub-FAF is stable and the inversion count thereof is correspondingly low. Thus if the result of the check in step 1310 is negative, the CPU 32 terminates this routine immediately. When the three-way catalytic converter 13 has deteriorated, the behavior of the sub-FAF is disturbed. In that case, the CPU 32 proceeds from step 1310 to 1311. In step 1311, the catalyst deterioration flag XCATDT2 indicating the presence/absence of possible catalyst deterioration is set to "1."

Figure 23:
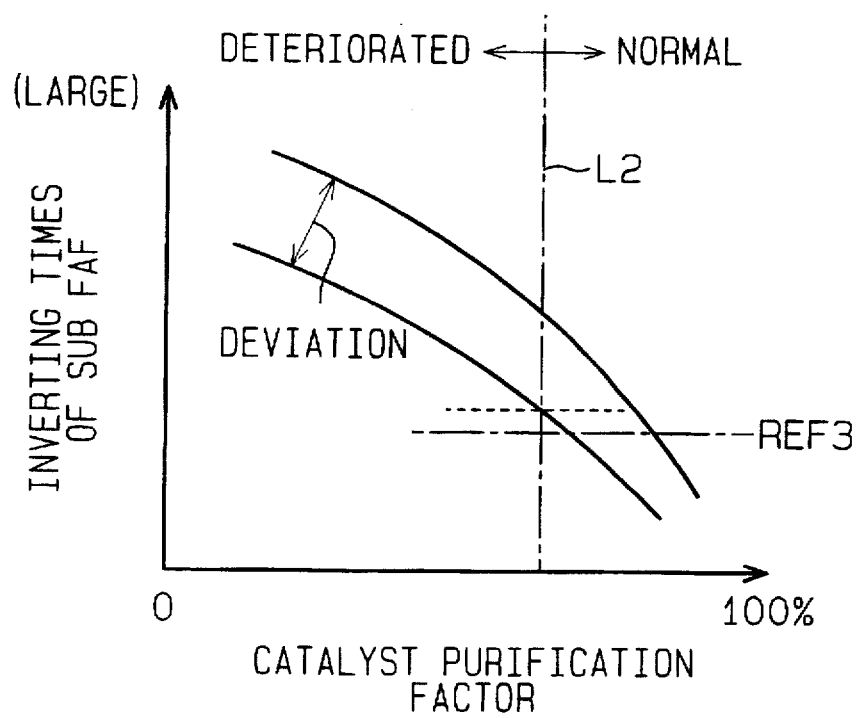
FIG. 23 is a graphic representation depicting a typical relationship between inversion count of a sub-FAF and a catalyst purification factor.

In the above example, the deterioration reference value REF3 for the inversion count of the sub-FAF is set as shown in FIG. 23. In FIG. 23, the boundary L2 separates the region considered normal from the region regarded as deteriorated. As illustrated in FIG. 23, the deterioration reference value REF3 is set below the lowest deviation on the boundary L2. That is, as long as the lowest deviation of the amplitude is not exceeded (i.e., inversion count≦deterioration reference value REF3), there is no possibility (suspicion) of the deterioration in the three-way catalytic converter 13. Thus the determination is that the catalyst is obviously normal (XCATDT2=0). If the lowest deviation of the amplitude is exceeded (i.e., inversion count>deterioration reference value REF3), the determination is that the three-way catalytic converter 13 has possibly deteriorated (XCATDT2=1).

Further, the third embodiment described above sets different catalyst deterioration flags separately using the first catalyst deterioration determining routine through the third catalyst deterioration determining routine (FIGS. 13, 15 and 17), and makes a final deterioration determination by checking the respective flags through the use of the final catalyst deterioration determining routine of FIG. 21. This embodiment may be modified as follows: For example, when the catalyst is determined to have deteriorated by the catalyst deterioration first determining routine, the execution of the second and third catalyst deterioration determining routines may be suppressed. Such a modification will now be described with reference to FIGS. 24 and 25.

Figure 24:
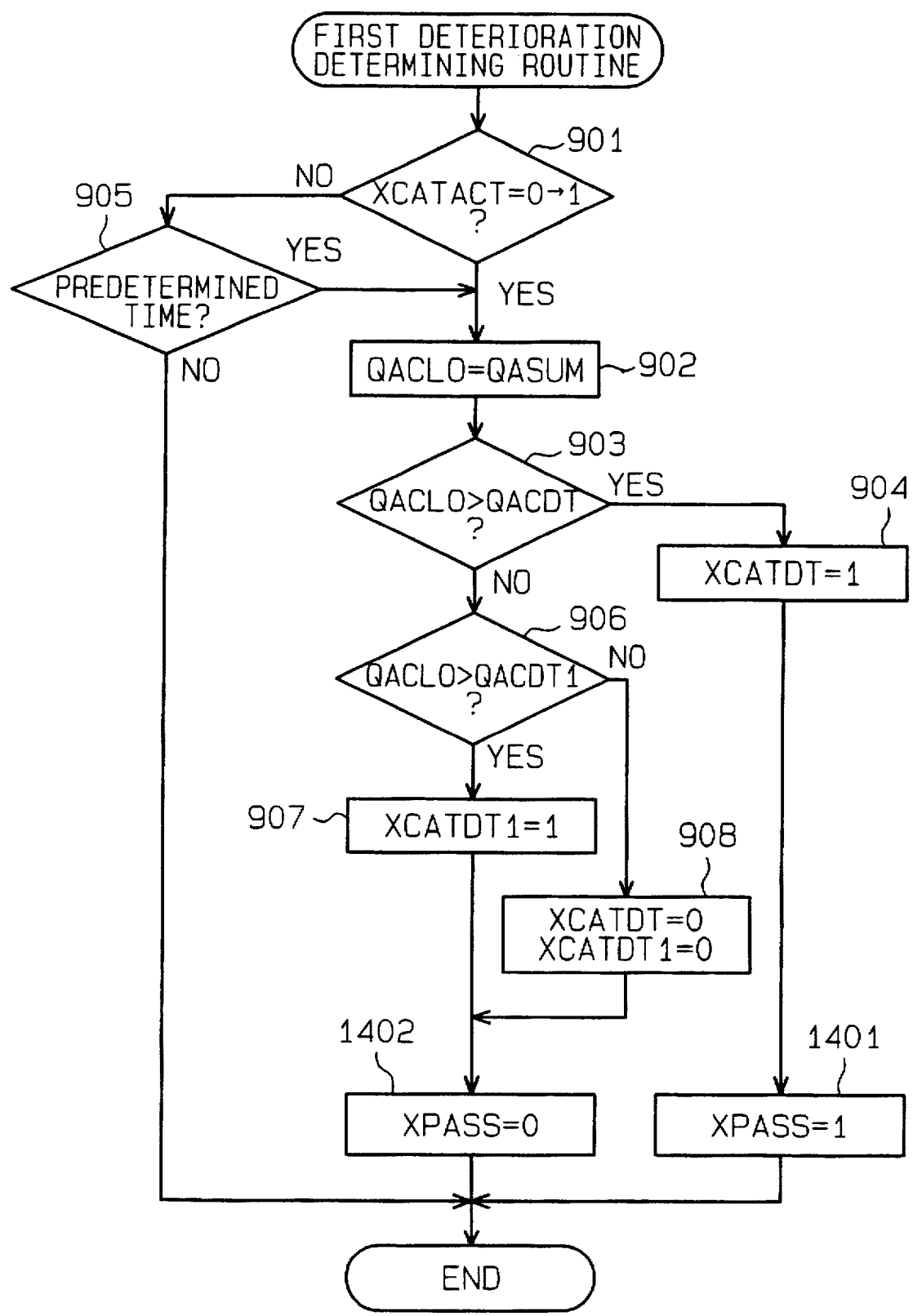
FIG. 24 is a flowchart of the catalyst deterioration first determining routine, which is a partially modified version of the routine in FIG. 13.
Figure 25:
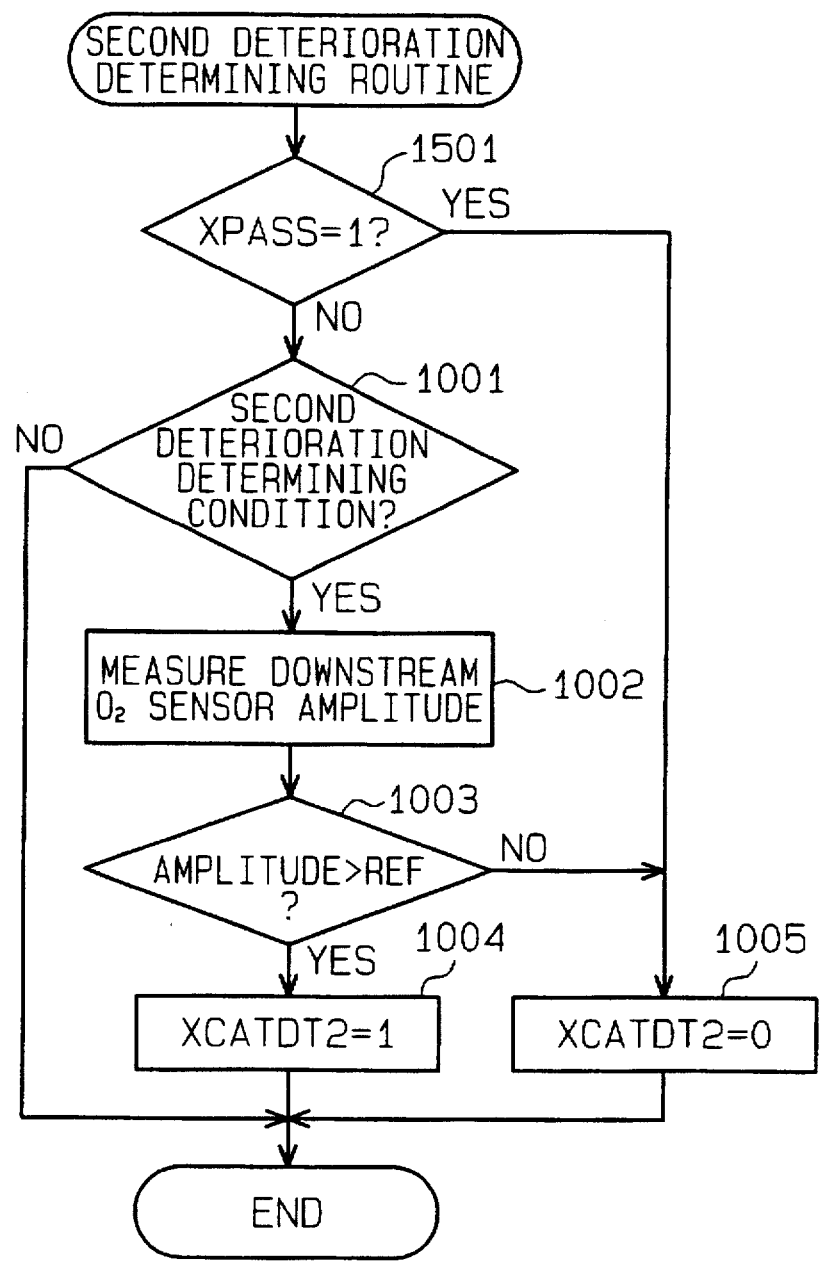
FIG. 25 is a flowchart of the catalyst deterioration second determining routine, which is a partially modified version of the routine in FIG. 15.

FIG. 24 shows the flowchart of a partly modified version of the routine depicted in FIG. 13 (i.e., first catalyst deterioration determining routine), and FIG. 25 gives the flowchart of a partly modified version of the routine in FIG. 15 (second catalyst deterioration determining routine). In step 904 of FIG. 24, the CPU 32 determines that the catalyst has deteriorated. Step 904 is followed by step 1401 in which a flag XPASS is set to "1" to skip the processing of the second and third catalyst deterioration determining routines. If the CPU 32 determines that the catalyst has possibly deteriorated or is normal in step 907 or 908, the CPU 32 sets the flag XPASS to "0" to execute the catalyst deterioration second and third determining routines (in step 1402).

In step 1501 of FIG. 25, the CPU 32 checks to see if the flag XPASS is "1." If the flag XPASS is found to be "1," the CPU 32 goes to step 1005 in which the catalyst deterioration flag XCATDT2 is set to "0." That is, the second catalyst deterioration determining routine is carried out (steps 1001 through 1004) only if XPASS=0. If XPASS=1, the second catalyst deterioration determining routine is not executed. The third catalyst deterioration determining routine of FIG. 17, too, is not carried out (steps 1101 through 1110) if the check on the flag XPASS indicates that the flag is "1" at the start of the routine processing.

When the first catalyst deterioration determining routine finds the catalyst to have deteriorated, the execution of the additional steps above suppresses the processing of the second and third catalyst deterioration determining routines. This simplifies the processing as a whole and alleviates the operation load on the inventive apparatus.

As described, the third embodiment determines catalyst deterioration and groups the result into one of three categories: normality, possible deterioration and deterioration. Alternatively, the deterioration of the catalyst may be determined and the result grouped into one of four, five or more categories in accordance with the degree of catalyst deterioration.

(Fifth Embodiment)

A fifth embodiment of the invention will now be described. Whereas each of the embodiments described so far is an apparatus for determining the deterioration of the three-way catalytic converter 13, the fifth embodiment is an apparatus for diagnosing a failure of the exhaust emission control device integrating the three-way catalytic converter 13, upstream air-fuel ratio sensor (A/F sensor 26) and downstream air-fuel ratio sensor (downstream O2 sensor 27).

That is, the fifth embodiment is primarily designed to diagnose device failure in accordance with the quantity of heat required up to the activation of the three-way catalytic converter 13. In this case, it will be understood that the fifth embodiment is capable not only of determining the deterioration of the three-way catalytic converter 13 based on that quantity of heat but also of diagnosing a failure of the upstream and downstream air-fuel ratio sensors. In implementing the fifth embodiment, the CPU 32 of FIG. 1 constitutes the air-fuel ratio control means, catalyst activation determining means, exhaust system failure detecting means, target air-fuel ratio inverting means, upstream sensor failure detecting means, catalyst failure determining means, and downstream sensor failure determining means.

Figure 26:
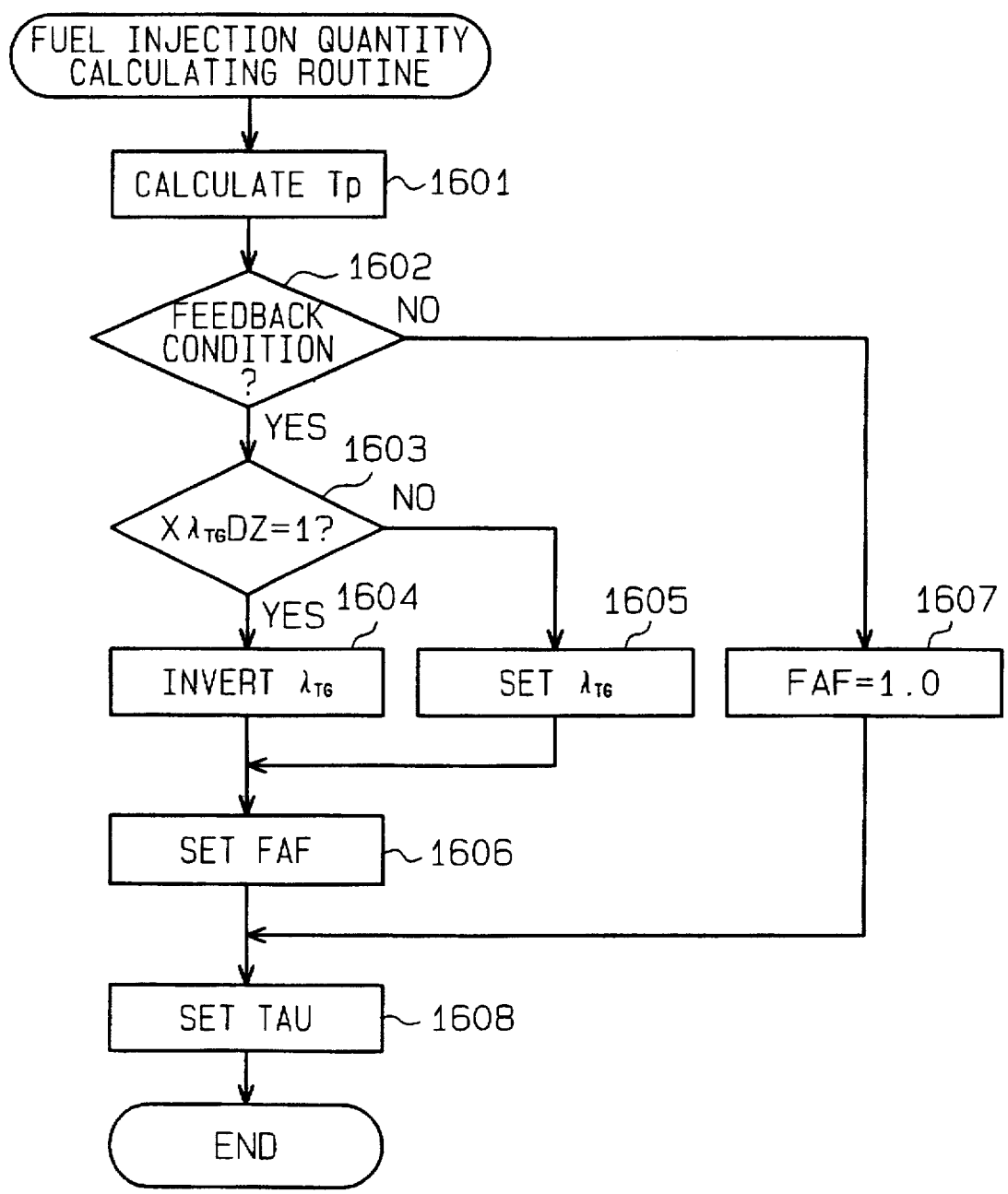
FIG. 26 is a flowchart of the fuel injection quantity calculating routine in a fifth embodiment.
Figure 27:
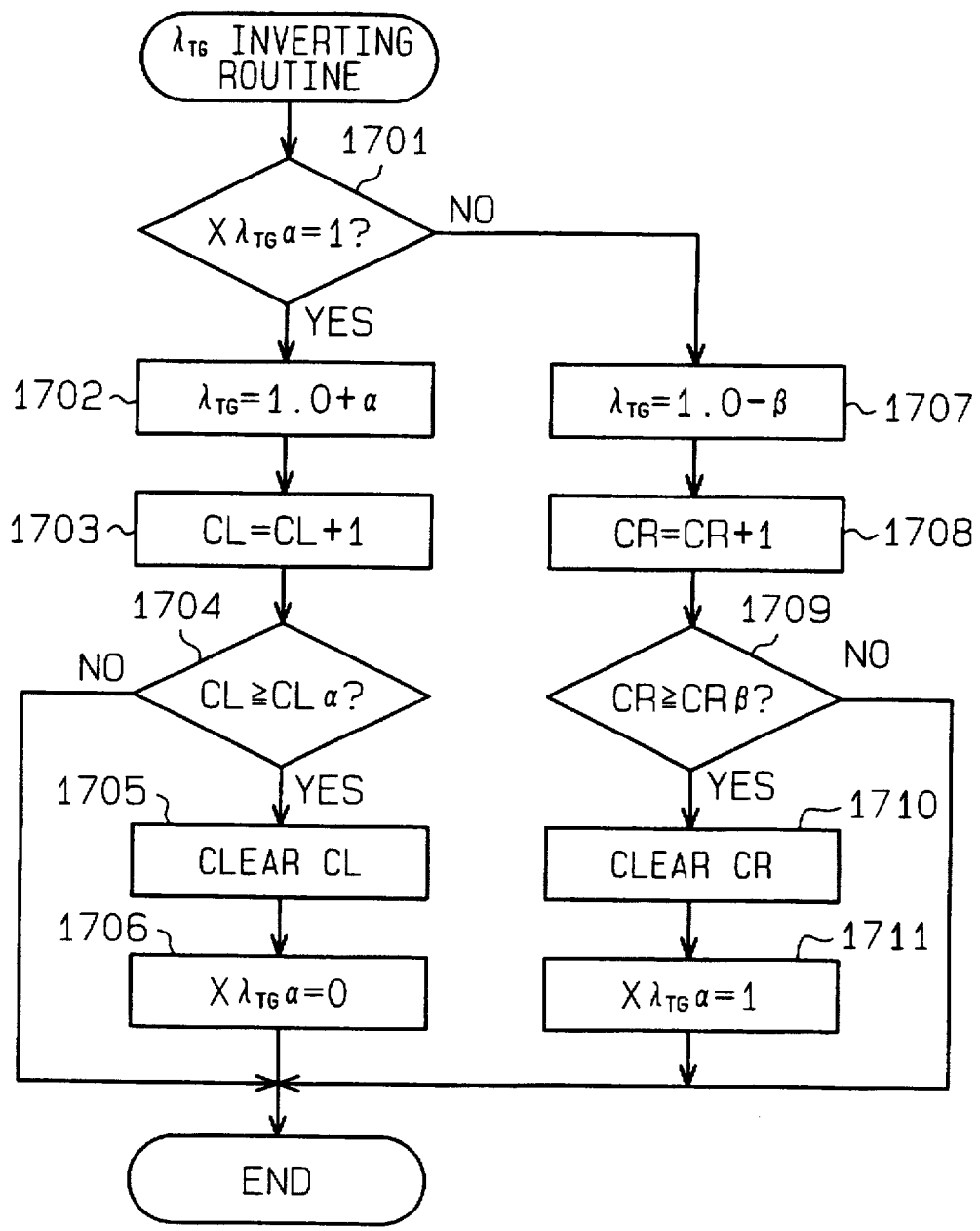
FIG. 27 is a flowchart of a λTG inverting routine in the fifth embodiment.

FIGS. 26 through 35 are flowcharts of steps constituting the control programs executed by the CPU 32 in implementing the fifth embodiment. The processing routine of FIG. 26 is executed at fuel injection intervals of the fuel injection valve 7 attached to each cylinder. The routines of FIGS. 28 through 35 are each carried out at appropriate predetermined intervals (e.g., at intervals of 32 ms). FIG. 27 shows a subroutine subordinate to the processing routine in FIG. 26. FIGS. 36A–36H are timing charts for describing major operations of the fifth embodiment at the start-up of the engine.

Operation of the fifth embodiment will now be outlined with reference to the timing charts of FIGS. 36A–36H. In the fifth embodiment, the internal combustion engine 1 is started at a time t11 in the figures. At a time t12, a check is made to see if the upstream air-fuel ratio sensor (A/F sensor 26) and downstream air-fuel ratio sensor (downstream O2 sensor 27) are activated. At a time t13, a check is made to see if the three-way catalytic converter 13 is activated. More specifically, an upstream sensor activation flag XAFACT and a downstream sensor activation flag XSOXACT are both set to "1" at the time t12; the catalyst activation flag XCATACT is set to "1" at the time t13. Between the time t12 and the time t13, the target air-fuel ratio λTG is forcibly inverted from the rich state to the lean state or vice versa. A flag XλTGDZ which is set to "1" during the same period is a target air-fuel ratio inversion flag indicating the execution of the inversion of the target air-fuel ratio λTG between the rich and the lean state.

At the time that the catalyst activation flag XCATACT is changed from "0" to "1" (at the time t13), a provisional determination is made on the exhaust emission control device for failure. After provisional failure determination, the final determination on device failure is carried out using the result of the determination on the A/F sensor 27 for failure. The determination on the A/F sensor 27 is made regardless of the quantity of heat required up to catalyst activation (it should be noted that FIGS. 36A–36H depict the operations up to the provisional failure determination).

The control programs represented by the flowcharts in FIGS. 26 through 35 will now be described with reference to the timing charts of FIGS. 36A–36H.

FIG. 26 is the flowchart of a fuel injection quantity calculating routine. In step 1601 of FIG. 26, the CPU 32 calculates the basic fuel injection quantity Tp in accordance with the engine rotational speed Ne and intake air pressure PM currently in effect. In step 1602, the CPU 32 checks to see if the feedback condition for air-fuel ratio control is met. If the feedback condition is found to be met, step 1603 is reached. In step 1603, the CPU 32 checks to see if the target air-fuel ratio inversion flag XλTGDZ is "1." If XλTGDZ=1, the CPU 32 goes to step 1604. In step 1604, the inversion of the target air-fuel ratio λTG is executed (between the time t12 and the time t13 in FIGS. 36A–36H). If XλTGDZ=0, step 1605 is reached. In step 1605, the CPU 32 sets the target air-fuel ratio λTG in accordance with the state of engine operation currently in effect.

After the target air-fuel ratio λTG is set, the CPU 32 proceeds to step 1606. In step 1606, the CPU 32 sets a feedback correction coefficient FAF such as to make the air-fuel ratio λ equal to the target air-fuel ratio λTG. Here, the feedback correction coefficient FAF is calculated by use of known methods which will not be discussed further (one such method was described in connection with the first embodiment). In step 1608, the CPU 32 sets the fuel injection quantity TAU and terminates this routine (TAU= TpxFAFxFALL).

If the feedback condition is not met in step 1602, the CPU 32 goes to step 1607 in which the coefficient FAF is set to 1.0. Step 1607 is followed by step 1608 in which the fuel injection quantity TAU is set.

The process in step 1604 for inverting the target air-fuel ratio λTG will now be described further in the form of the λTG inverting routine in FIG. 27.

In FIG. 27, the CPU 32 first checks in step 1701 to see if an air-fuel ratio rich-to-lean flag XλTGα is "1." The air-fuel ratio rich-to-lean flag XλTGα is a flag that allows the target air-fuel ratio λTG to be forcibly inverted from the rich state to the lean state relative to the stoichiometric air-fuel ratio (λ=1). If XλTGα=1, it means that the target air-fuel ratio is inverted from the rich state to the lean state; if XλTGα=0, it means that the target air-fuel ratio is inverted from the lean state to the rich state.

If XλTGα=1 at the beginning of the routine execution, the CPU 32 goes from step 1701 to step 1702. In step 1702, the target air-fuel ratio λTG is set to "1+α" (α>0). In other words, the target air-fuel ratio λTG is set to the lean state. In step 1703, the CPU 32 increments a rich-to-lean counter CL by 1. In step 1704, a check is made to see if the value on the rich-to-lean counter CL exceeds a predetermined reference value CLα. If CL<CLα, the CPU 32 decides negatively in step 1704 and terminates this routine immediately. In this case, the lean state of the air-fuel ratio is continued.

If CL≧CLα, the CPU 32 decides affirmatively in step 1704 and proceeds to step 1705. In step 1705, the rich-to-lean counter CL is cleared to "0." In step 1706, the CPU 32 clears the air-fuel ratio rich-to-lean flag XλTGα to "0" and terminates this routine.

Where XλTGα is set to "0," the CPU 32 decides negatively in step 1701 and goes to step 1707. In step 1707, the CPU 32 sets the target air-fuel ratio λTG to "1−β" (β0), i.e., to the rich state. In step 1708, the CPU 32 increments a lean-to-rich counter CR by 1. In step 1709, a check is made to see if the value on the lean-to-rich counter CR exceeds a predetermined reference value CRβ. If CR<CRβ, the CPU 32 decides negatively in step 1709 and terminates this routine immediately. In this case, the rich state of the air-fuel ratio is continued.

When CR≧CRβ, the CPU 32 decides affirmatively in step 1709 and goes to step 1710. In step 1710, the lean-to-rich counter CR is cleared to "0." In step 1711, the CPU 32 sets the air-fuel ratio rich-to-lean flag XλTGα to "1" and terminates this routine.

According to the routine of FIG. 27, the target air-fuel ratio λTG is inverted as described from the rich state to the lean state and vice versa at appropriate intervals between the time t12 and time t13. Correspondingly, the upstream air-fuel ratio is also inverted with respect to the stoichiometric air-fuel ratio (λ=1).

Figure 28:
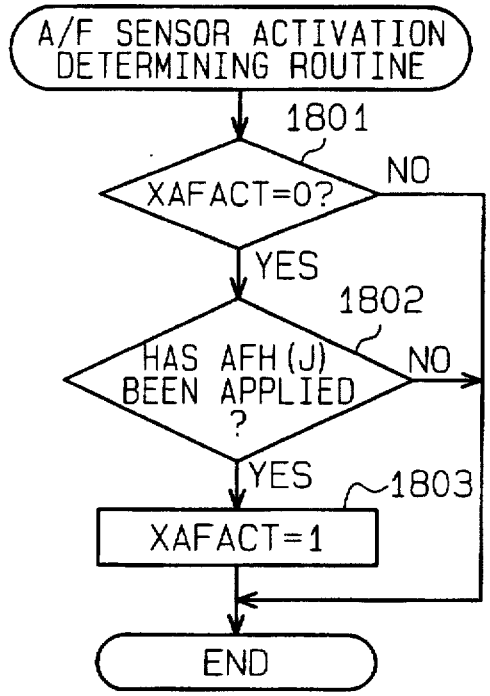
FIG. 28 is a flowchart of a routine for determining the activation of the A/F sensor in the fifth embodiment.

Shown in FIG. 28 is the flowchart of the routine for determining the activation of the A/F sensor 26 (upstream air-fuel ratio sensor). In step 1801 of FIG. 28, the CPU 32 checks to see if the upstream sensor activation flag XAFACT is "0." If XAFACT=1, i.e., if the A/F sensor 26 is already determined to be activated, the CPU 32 terminates this routine immediately.

If XAFACT=0, i.e., if the A/F sensor 26 has yet to be determined to be active, the CPU 32 goes to step 1802. In step 1802, a check is made to see if a predetermined quantity of heat AFH (in joules) has been applied since the power-up or turn-on of the heater 26a attached to the A/F sensor 26. The check in step 1802 is made on the basis of the electric power fed to the heater 26a. If the result of the check in step 1802 is negative, the CPU 32 terminates this routine immediately. If the result of the check in step 1802 is affirmative, step 1803 is reached. In step 1803, the CPU 32 sets the upstream sensor activation flag XAFACT to "1" and terminates this routine.

Figure 29:
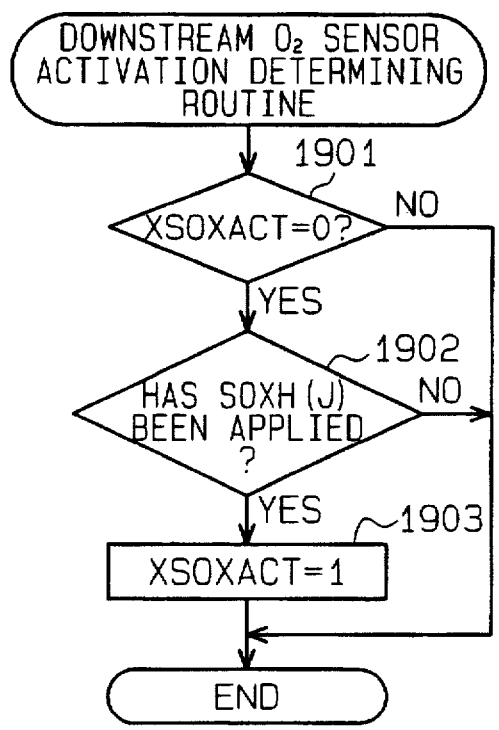
FIG. 29 is a flowchart of a routine for determining activation of a downstream O2 sensor in the fifth embodiment.

Shown in FIG. 29 is the flowchart of the routine for determining the activation of the downstream O2 sensor 27 (downstream air-fuel ratio sensor). As with the routine of FIG. 28, the routine of FIG. 29 determines downstream sensor activation on the basis of the electric power fed to the applicable heater. In step 1901 of FIG. 29, the CPU 32 first checks to see if the downstream sensor activation flag XSOXACT is "0." If XSOXACT=0, the CPU 32 goes to step 1902. In step 1902, a check is made to see if a predetermined quantity of heat SOXH (in joules) has been applied since the turn-on of the heater 27a attached to the downstream O2 sensor 27. The check in step 1902 is made on the basis of the electric power fed to the heater 27a. If the result of the check in step 1902 is affirmative, step 1703 is reached. In step 1703, the CPU 32 sets the downstream sensor activation flag XSOXACT to "1" and terminates this routine.

In the timing charts of FIGS. 36A–36H, the timings are arranged to be the same for activating the A/F sensor 26 and downstream O2 sensor 27 for the sake of convenience. At the time t12 in FIG. 36E, the activation flags XAFACT and XSOXACT of the two sensors are both set to "1."

Figure 30:
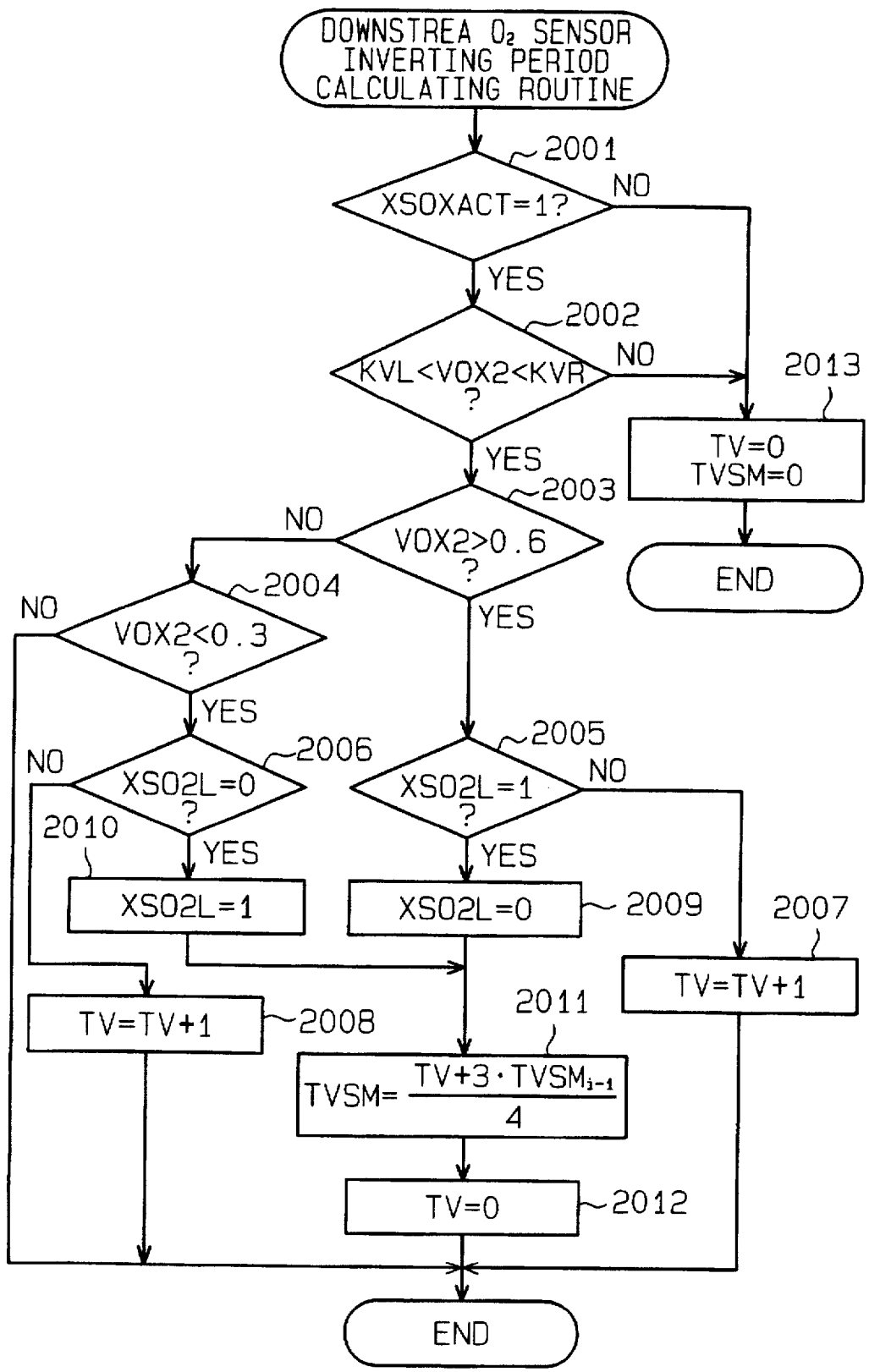
FIG. 30 is a flowchart of a routine for calculating inverting period of the downstream O2 sensor in the fifth embodiment.

FIG. 30 shows the flowchart of the routine for calculating the period in which to invert the output of the downstream O2 sensor 27. The routine in FIG. 30 is approximately the same in function as that in FIG. 4 for the first embodiment (i.e., routine for calculating the inverting period of the downstream O2 sensor 27).

In step 2001 of FIG. 30, the CPU 32 first checks to see if the downstream sensor activation flag XSOXACT is set to "1." In step 2002, a check is made to see if the output voltage VOX2 of the downstream O2 sensor 27 falls between the allowable lean value KVL (e.g., 0.1 V) and the allowable rich value KVR (e.g., 0.9 V). If the results of the checks in steps 2001 and 2002 are both affirmative, the CPU 32 goes to step 2003.

In steps 2003 through 2012, the CPU 32 calculates the rich-lean inversion period TV of the output voltage VOX2 and the averaged value TVSM of the period TV in accordance with the rich-lean inversion state of the output voltage VOX2. More specifically, in step 2003, the CPU 32 checks to see if the output voltage VOX2 exceeds a rich-side reference value (0.6 V). In step 2004, a check is made to see if the output voltage VOX2 is less than a lean-side reference value (0.3 V). In steps 2005 and 2006, the CPU 32 verifies the state of the lean determination flag XSO2L indicating the air-fuel ratio determination of the preceding process.

In the case above, if the rich state of the preceding process is found to be continued in the current process (VOX2 (0.6 V), the CPU 32 proceeds through steps 2003, 2005 and 2007, in that order. In step 2007, the CPU 32 increments the inverting period TV by 1. If the lean state of the preceding process is found to be continued in the current process (VOX2<0.3 V), then the CPU 32 proceeds through steps 2003, 2004, 2006 and 2008, in that order. In step 2008, the CPU 32 increments the inverting period TV by 1.

If the air-fuel ratio is inverted from the lean state to the rich state, the CPU 32 proceeds through steps 2003, 2005, 2009 and 2011, in that order. In step 2011, the CPU 32 calculates the averaged value TVSM of the inverting period TV {TVSM=(TV+3×TVSMi-1)/4}. If the air-fuel ratio is inverted from the rich state to the lean state, the CPU 32 proceeds through steps 2003, 2004, 2006, 2010 and 2011, in that order. In step 2011, the CPU 32 calculates the averaged value TVSM of the inverting period TV. After calculation of the averaged value TVSM, the CPU 32 proceeds to step 2012 to clear the inverting period TV to "0," and terminates this routine.

If the result of the check in step 2001 or 2002 is negative, the CPU 32 goes to step 2013. In step 2013, the CPU 32 clears the inverting period TV and its averaged value TVSM to "0," and terminates this routine. That is, if the downstream O2 sensor 27 has yet to be activated or if the air-fuel ratio is found to have deviated significantly from the stoichiometric air-fuel ratio, the detection of the inverting period TV is inhibited so as to prevent erroneous detection.

Figure 31:
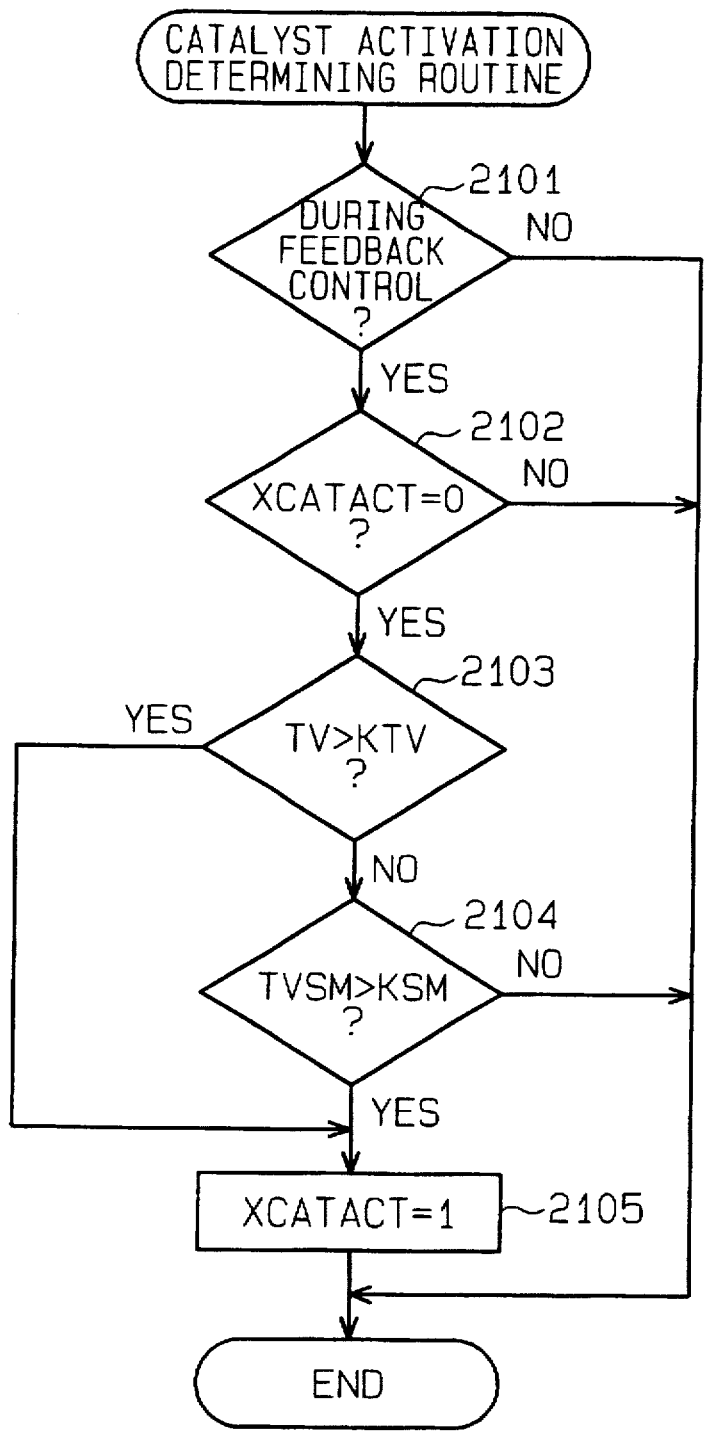
FIG. 31 is a flowchart of a catalyst activation determining routine in the fifth embodiment.

FIG. 31 shows the flowchart of the routine for determining the activation of the three-way catalytic converter 13. The routine in FIG. 31 is approximately the same in function as that in FIG. 5 for the first embodiment (i.e., routine for determining catalyst activation).

In FIG. 31, the CPU 32 first checks in step 2101 to see if air-fuel ratio feedback control is being executed. If air-fuel ratio feedback control is in effect, step 2102 is reached. In step 2102, the CPU 32 checks to see if the catalyst activation flag XCATACT is "0," i.e., if the three-way catalytic converter 13 has yet to be activated. If XCATACT=0 (before catalyst activation), step 2103 is reached. If the result of the check either in step 2101 or in step 2102 is negative, the CPU 32 terminates this routine immediately.

In step 2103, the CPU 32 checks to see if the invert ing period TV of the output voltage VOX2 exceeds the predetermined reference value KTV. In step 2104, a check is made to see if the averaged value TVSM of the inverting period TV exceeds the predetermined reference value KSM. If the result of the check either in step 2103 or in step 2104 is affirmative, the three-way catalytic converter 13 is determined to be activated. The CPU 32 then proceeds to step 2106 and sets the catalyst activation flag XCATACT to "1," and terminates this routine.

That is, according to the above routines in FIGS. 30 and 31, the period of time in which the lean determination flag XSO2L is kept at "1" or "0" corresponds to the inverting period TV. As shown in the timing chart of FIG. 36F, the catalyst activation flag XCATACT is set to "1" at the time t13 when the inverting period TV exceeds the reference value KTV.

Figure 32:
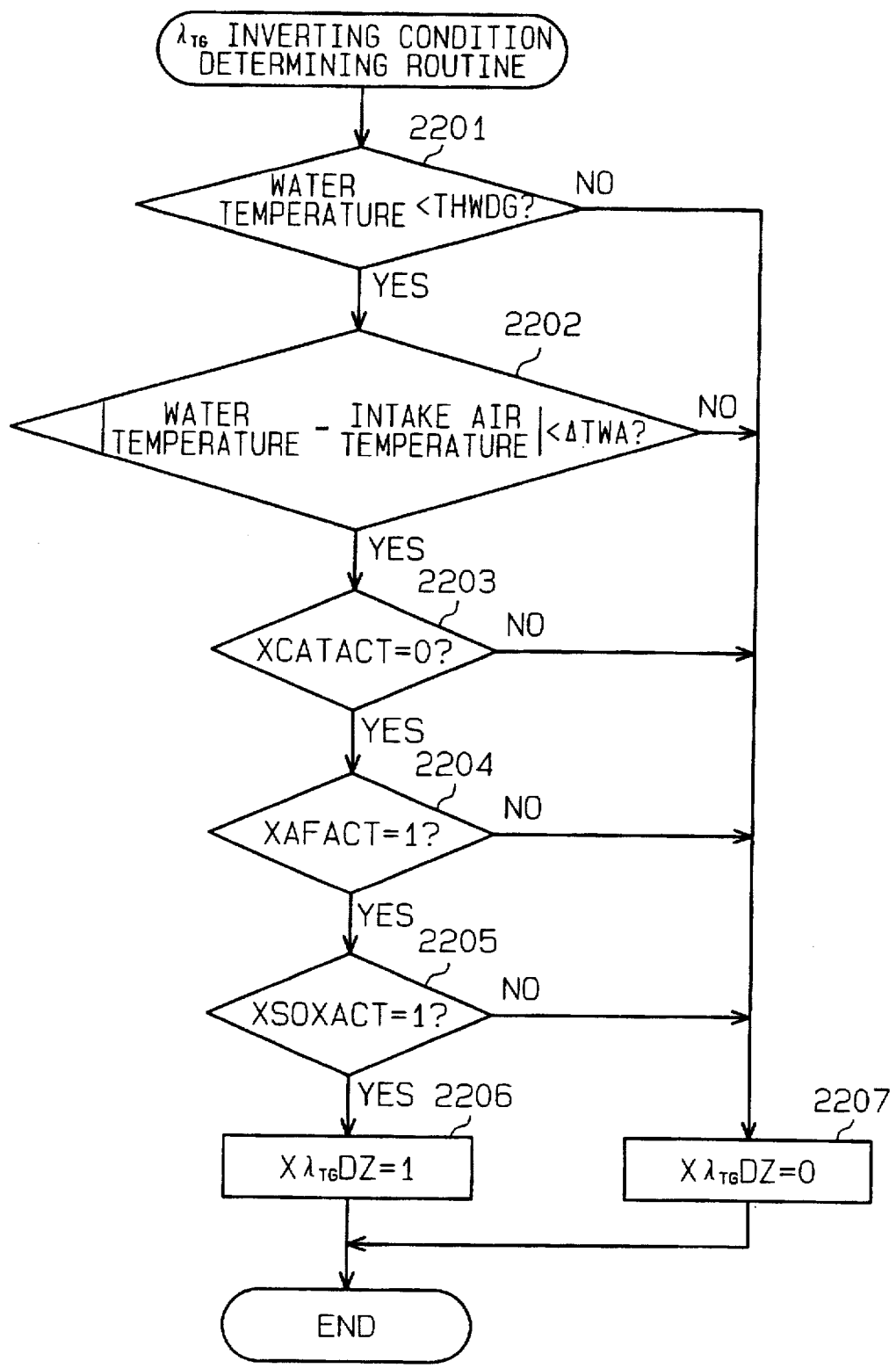
FIG. 32 is a flowchart of a λTG inversion condition determining routine in the fifth embodiment.

Shown in FIG. 32 is the flowchart of the routine for determining the λTG inverting condition, i.e., whether or not to invert the target air-fuel ratio λTG. This routine involves following steps 2201 through 2205 in which to make the respective checks. If the results of the checks in all these steps are affirmative, the target air-fuel ratio inversion flag XλTGDZ for permitting inversion of the target air-fuel ratio λTG is set to "1."

More specifically, a check is first made in step 2201 to see if the water temperature at the start-up of the internal combustion engine 1 is lower than a predetermined value THWDG. In step 2202, a check is made to see if the absolute value of "start-up water temperature—start-up intake air temperature" is less than a predetermined value ΔTWA. That is, if the condition in step 2201 is not found to be met, the quantity of heat required up to the activation of the three-way catalytic converter 13 can be too dispersed to permit the diagnosis of failure. Hence the need to perform the check in step 2202 so as to avert a decrease in diagnostic accuracy or outright misdiagnosis. In step 2203, a check is made to see if the catalyst activation flag XCATACT is "0." In step 2204, a check is made to see if the upstream sensor activation flag XAFACT is "1." In step 2205, a check is made to see if the downstream sensor activation flag XSOXACT is "1".

If the results of the checks in steps 2201 through 2205 are all affirmative, the CPU 32 goes to step 2206. In step 2206, the CPU 32 sets the target air-fuel ratio inversion flag XλTGDZ to "1." If any one of the checks in steps 2201 through 2205 has a negative result, the CPU 32 goes to step 2207 in which the target air-fuel ratio inversion flag XλTGDZ is set to "0."

Referring to FIGS. 36A–36H, the target air-fuel ratio inversion flag XλTGDZ is set to "1" at the time t12 when the activation flags XAFACT and XSOFACT for the two sensors 26 and 27 are both set. This allows the target air-fuel ratio λTG to be inverted. At the time t13, the target air-fuel ratio inversion flag XλTGDZ is cleared to "0" when the catalyst activation flag XCATACT is set. This inhibits the target air-fuel ratio λTG from being inverted.

Figure 33:
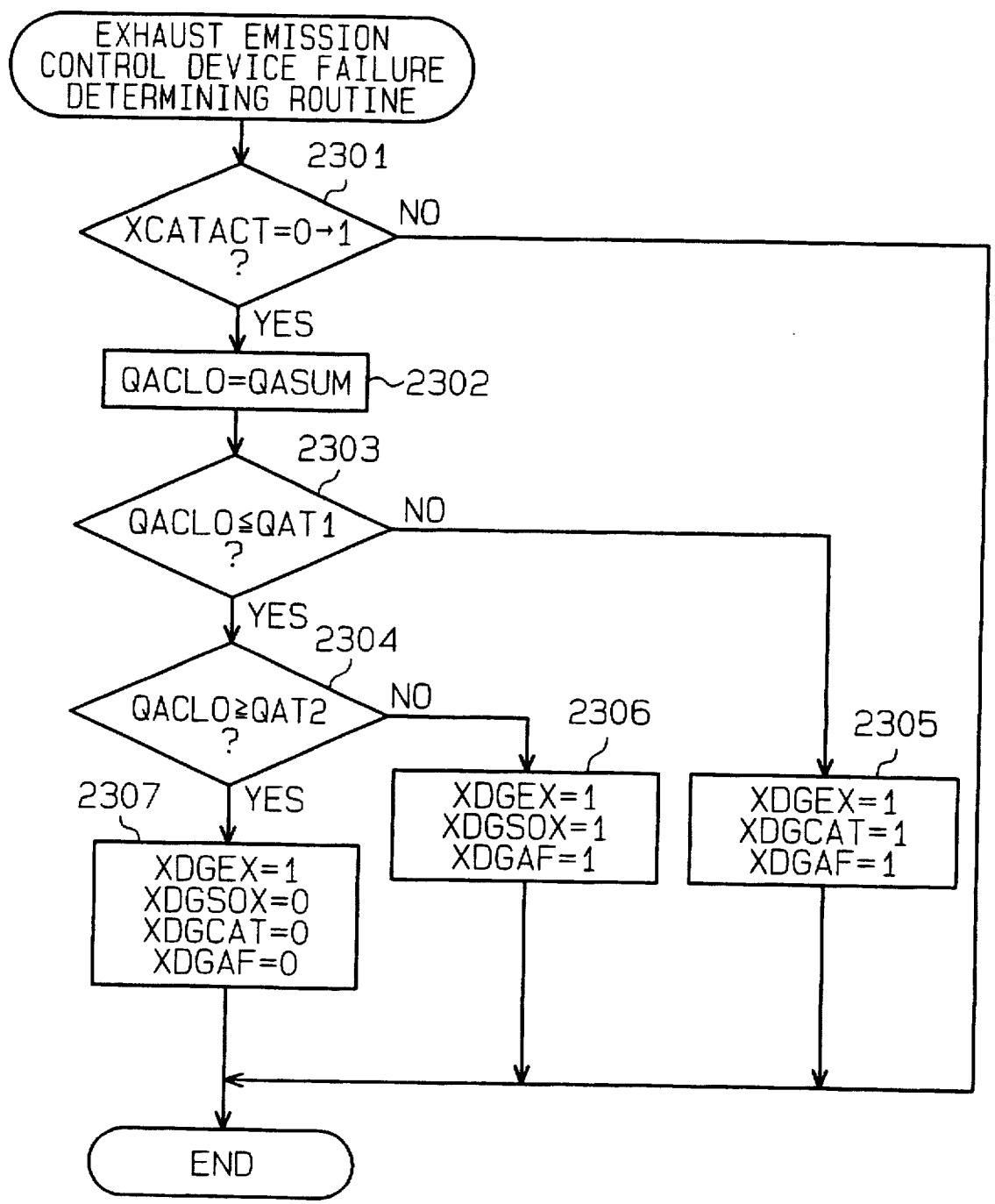
FIG. 33 is a flowchart of a routine for determining a failure of the exhaust emission control device in the fifth embodiment.

Shown in FIG. 33 is the flowchart of a failure determining routine for making a provisional determination on the presence/absence of failure in the exhaust emission control device (comprising the three-way catalytic converter 13, A/F sensor 26 and downstream O2 sensor 27). In FIG. 33, the CPU 32 first checks in step 2301 to see if the catalyst activation XCATACT is changed from "0" to "1." If the zero-to-one change is detected, step 2302 is reached. In step 2302, the CPU 32 sets the accumulated intake air quantity QASUM to "QACLO" and stores it. As mentioned earlier, the accumulated intake air quantity QASUM is an accumulation of the intake air quantity QA calculated at predetermined intervals since the start-up of the engine. The calculation is performed illustratively by the routine of FIG. 7 for the first embodiment.

With the accumulated intake air quantity QASUM stored, the CPU 32 proceeds from step 2303 to 2307. In these steps, the CPU 32 diagnoses the exhaust emission control device (comprising the three-way catalytic converter 13, A/F sensor 26 and downstream O2 sensor) for failure in accordance with the accumulated intake air quantity QASUM. Referring to FIG. 36H, the level of the accumulated intake air quantity QASUM upon catalyst activation is determined in accordance with a first failure reference value QAT1 (i.e., corresponding to the first reference value) and a second failure reference value QAT2 (second reference value; QAT1>QAT2). In this case, the range between QAT1 and QAT2 is set as the normal region.

In step 2303, the CPU 32 checks to see if the value QACLO is less than the first failure reference value QAT1. In step 2304, a check is made to see if the value QACLO is equal to or greater than the second failure reference value QAT2. If QACLO>QAT1, the negative result of the check in step 2304 brings the CPU 32 to step 2305. In step 2305, the CPU 32 sets to "1" an exhaust system failure provisional flag XDGEX, a catalyst activation failure provisional flag XDG-CAT and an upstream sensor failure provisional flag XDGAF, and then terminates this routine.

If QACLO<QAT2, the result of the check in step 2304 is negative and the CPU 32 goes to step 2306. In step 2306, the CPU 32 sets to "1" the exhaust system failure provisional flag XDGEX, a downstream sensor failure provisional flag XDGSOX and the upstream sensor failure provisional flag XDGAF, and then terminates this routine.

If QAT2≦QACLO≦QAT1, the results of the checks in steps 2303 and 2304 are affirmative. In that case, the CPU 32 goes to step 2307. In step 2307, the CPU 32 resets to "0" the exhaust system failure provisional flag XDGEX, downstream sensor failure provisional flag XDGSOX, catalyst activation failure provisional flag XDGCAT and upstream sensor failure provisional flag XDGAF. The CPU 32 then terminates this routine.

Described below with reference to FIGS. 37A1–37C2 are modes by which failures are determined as outlined in FIG. 33. FIGS. 37A1 and 37A2 show waveforms in effect when the determination denotes normality (QAT2≦QACLO≦QAT1); FIGS. 37B1 and 37B2 indicate waveforms in effect when the determination denotes a failed state (QACLO>QAT1); FIGS. 37C1 and 37C2 illustrate waveforms in effect when the determination denotes another failed state (QACLO<QAT2).

In the case of FIGS. 37A1 and 37A2, the A/F sensor 26 is normal and can detect the air-fuel ratio corresponding to the command given by the $\lambda$TG inverting routine of FIG. 27 designating the inversion of the target air-fuel ratio $\lambda$TG. The waveform of the air-fuel ratio $\lambda$ reflects the rich-to-lean inversion ($\lambda$TG=1+$\alpha$) of the ratio or the lean-to-rich inversion ($\lambda$TG=1–$\beta$) currently in effect. Because the three-way catalytic converter 13 and downstream O2 sensor 27 are normal, the oxygen storage volume of the catalyst increases as the warm-up progresses. As the output voltage VOX2 of the downstream O2 sensor 27 is reduced in amplitude, the inverting period is prolonged correspondingly. Under these conditions, the quantity of heat required up to the activation of the three-way catalytic converter 13 (i.e., accumulated intake air quantity QASUM) falls within the normal range (between QAT1Q and QAT2).

Figure 38:
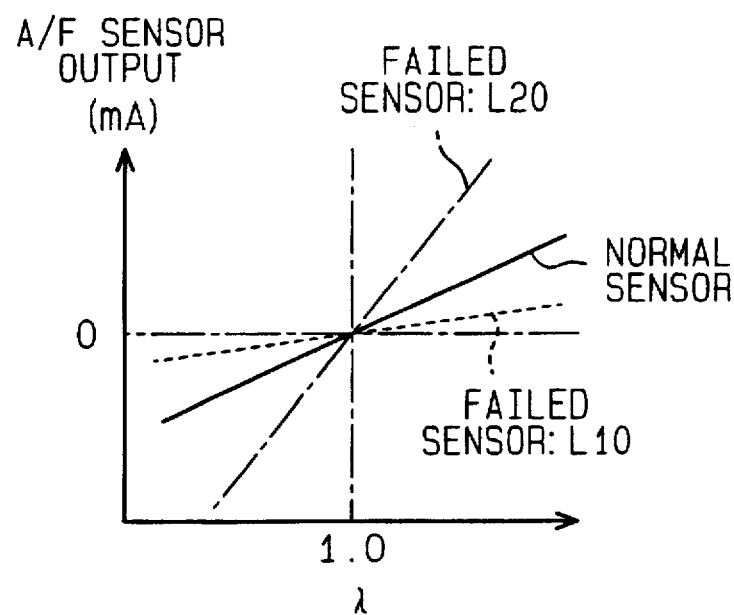
FIG. 38 is a graphic representation denoting abnormalities of the A/F sensor.
Figure 39:
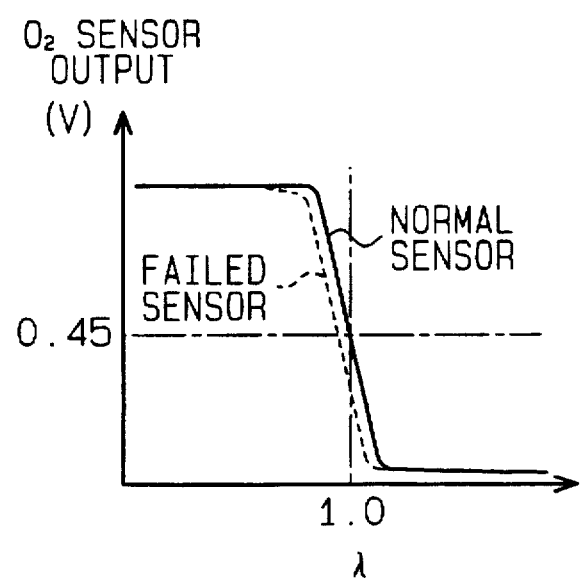
FIG. 39 is a graphic representation indicating abnormalities of the downstream O2 sensor.

In the case of FIGS. 37B1 and 37B2, the output voltage of the downstream O2 sensor 27 varies with the air-fuel ratio $\lambda$ and the sensor is thus considered normal. By contrast, the oxygen storage volume of the three-way catalytic converter 13 does not increase even as the warm-up operation is continued. From this, a faulty catalyst (e.g., worsening of temperature rise capability) is suspected. If the A/F sensor 26 has failed, its output characteristic deteriorates, which leads to disruption of air-fuel ratio feedback control. In such a case, the amplitude of the air-fuel ratio $\lambda$ is expanded (broken lines denote the air-fuel ratio $\lambda$ in normal state), while the inversion of the output voltage VOX2 from the downstream O2 sensor 27 is continued unchanged (in a non-converging state). For example, if the output characteristic of the A/F sensor 26 deteriorates as indicated by a characteristic line L10 in FIG. 38, the actual air-fuel ratio $\lambda$ deviates excessively upon inversion of the target air-fuel ratio $\lambda$TG in such a way that the amplitude of the air-fuel ratio $\lambda$ exceeds its target range. With the amplitude of the air-fuel ratio $\lambda$ expanded, the output of the downstream O2 sensor 27 is delayed in converging on the target value.

In short, in this case, the increase in the quantity of heat is attributed to one of two reasons: either the quantity of heat (accumulated intake air quantity QASUM) is increased due to a drop in the temperature rise capability of the three-way catalytic converter 13; or the determination of catalyst activation is delayed because of the worsening output characteristic of the A/F sensor 26 (QASUM>QAT1).

Under these conditions, if the quantity of heat required up to the activation of the three-way catalytic converter 13 (QASUM) is greater than the reference value QAT1 (i.e., "NO" in step 2303 of FIG. 33 because QASUM>QAT1), either the A/F sensor 26 or the three-way catalytic converter 13 is determined to have failed. In that case, the CPU 32 proceeds to step 2305 in FIG. 33 and sets the exhaust system (i.e., exhaust emission control device) failure provisional flag, catalyst (three-way catalytic converter 13) activation failure provisional flag, and upstream sensor (A/F sensor 26) failure provisional flag (XDGEX=1, XDGCAT=1, XDGAF=1).

FIGS. 37C1 and 37C2 correspond to a case where the three-way catalytic converter 13 is determined to be activated earlier than normal. In such a case, it is difficult to determine whether the oxygen storage volume of the catalyst 13 is satisfactory. On the other hand, the downstream O2 sensor 27 is suspected of failure because of the unavailability of its inverting operation. For example, an abnormal sensor output characteristic such as that shown in FIG. 37C2 produces the abnormal waveform of FIG. 37C2. Where the A/F sensor 26 has failed, the output characteristic of the sensor worsens and disrupts air-fuel feedback control correspondingly. In this case, the amplitude of the air-fuel ratio $\lambda$ is reduced (broken lines denote the air-fuel ratio $\lambda$ in normal state), which in turn is thought to deteriorate the responsiveness of the downstream O2 sensor 27 as indicated. For example, as shown by a characteristic line L20 in FIG. 38, the deviation is minimum when the target air-fuel ratio $\lambda$TG is inverted, and the amplitude of the actual air-fuel ratio $\lambda$ becomes smaller than the target range. The reduction in the amplitude of the air-fuel ratio $\lambda$ entails worsening of the responsiveness of the downstream O2 sensor 27.

In short, the inverting operation of the downstream O2 sensor 27 is not available. This causes catalyst activation determination to be made earlier than normal and thus makes the quantity of heat (accumulated intake air quantity QASUM) lower than the reference value (i.e., QASUM<QAT2).

Under these conditions, if the quantity of heat required up to the activation of the three-way catalytic converter 13 (QASUM) is less than the reference value QAT1 (i.e., "NO" in step 2304 of FIG. 33 because QASUM<QAT2), either the A/F sensor 26 or the downstream O2 sensor 27 is determined to have failed. In that case, the CPU 32 proceeds to step 2306 in FIG. 33 and sets the exhaust system (i.e., exhaust emission control device) failure provisional flag, downstream sensor (O2 sensor 27) failure provisional flag, and upstream sensor (A/F sensor 26) failure provisional flag (XDGEX=1, XDGSOX=1, XDGAF=1).

Figure 34:
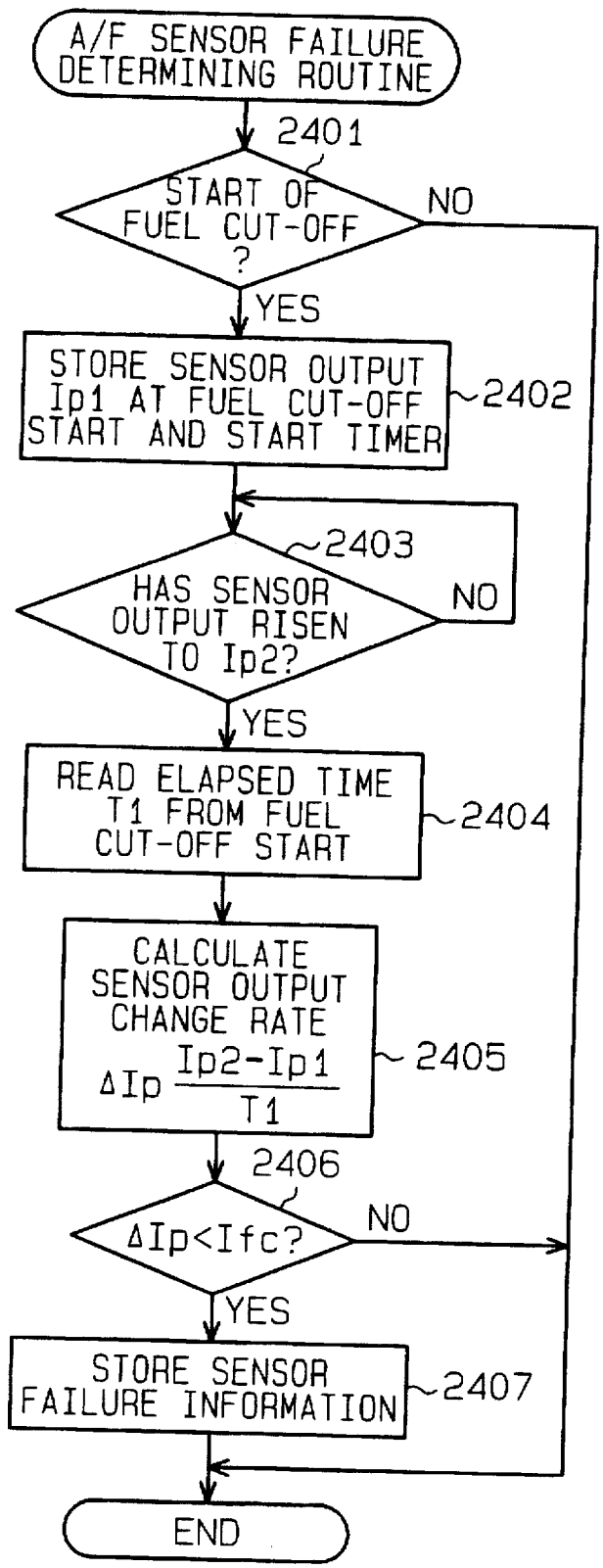
FIG. 34 is a flowchart of an A/F sensor failure determining routine in the fifth embodiment.

FIG. 34 shows the flowchart of the routine for determining a failure of the A/F sensor 26 (upstream air-fuel ratio sensor). This routine, unlike the failure determining routing of FIG. 33, determines failure of the A/F sensor 26 without the use of the quantity of heat required up to catalyst activation. Whereas the exhaust system failure determining routine of FIG. 33 determines the sensor for failure upon determination of the activation of the three-way catalytic converter 13, the routine of FIG. 34 determines a failure of the A/F sensor 26 at any time following the start-up of the engine.

In carrying out the routine of FIG. 34, the CPU 32 first checks in step 2401 to see if the cut-off of fuel is started. If fuel-cut-off has yet to be started, the CPU 32 terminates this routine without executing any subsequent steps. The cut-off of fuel is executed by a fuel-cut-off executing routine, not shown, when the engine is idling and when the rotational speed Ne of the engine at that time is in excess of a predetermined rotational speed.

If the result of the check in step 2401 is affirmative, the CPU 32 goes to step 2402. In step 2402, the CPU 32 reads the output Ip1 of the A/F sensor 26 (called the sensor output hereunder) at the start of fuel-cut-off. At the same time, the CPU 32 activates a timer to count the time that elapses after the starting of fuel-cut-off. Step 2402 is followed by step 2403 in which the CPU 32 checks to see if the sensor output Ip1 has risen to Ip2. Repeating the check, the CPU 32 waits for the sensor output to reach Ip2.

When the sensor output proceeds to Ip2, the CPU 32 goes to step 2404. In step 2404, the CPU 32 reads from the above-mentioned timer the elapsed time T1 from the time the cut-off of fuel was started until the sensor output reached Ip2. The elapsed time thus read is stored. In step 2405, the CPU 32 calculates the rate of change ΔIp in the sensor output {ΔIp=(Ip2−Ip1)/T1}.

Thereafter, the CPU 32 goes to step 2406 and checks to see if the rate of change ΔIp in the sensor output is less than a failure reference value Ifc. If ΔIp≧Ifc, the result of the check in step 2406 is negative, and this routine is terminated immediately. That is, it is determined that the A/F sensor 26 has not deteriorated in responsiveness, and the output of this sensor is thus considered normal.

A deterioration in the responsiveness of the A/F sensor 26 reduces the rate of change ΔIp in the sensor output. Thus ΔIp<Ifc. In that case, the result of the check in step 2406 is affirmative and the CPU 32 goes to step 2407. In step 2407, the CPU 32 retains information indicating failure of the sensor.

FIGS. 40A–40D are timing charts showing the operations of the A/F sensor failure determining routine of FIG. 34. In the figures, two-dot chain lines represent the waveforms in the normal state and solid lines those in an abnormal state. The cut-off of fuel starts at a time t21 in FIG. 40A. If the sensor is normal, the sensor output Ip2 is detected at a time t22. At the same time, a determination reflecting normality is made because ΔIP≧Ifc ("NO" in step 2406 of FIG. 34). If the sensor is faulty, the sensor output Ip2 is detected at a time t23. Simultaneously, a determination reflecting the failure is made because ΔIp<Ifc ("YES" in step 2406 of FIG. 34).

Figure 35:
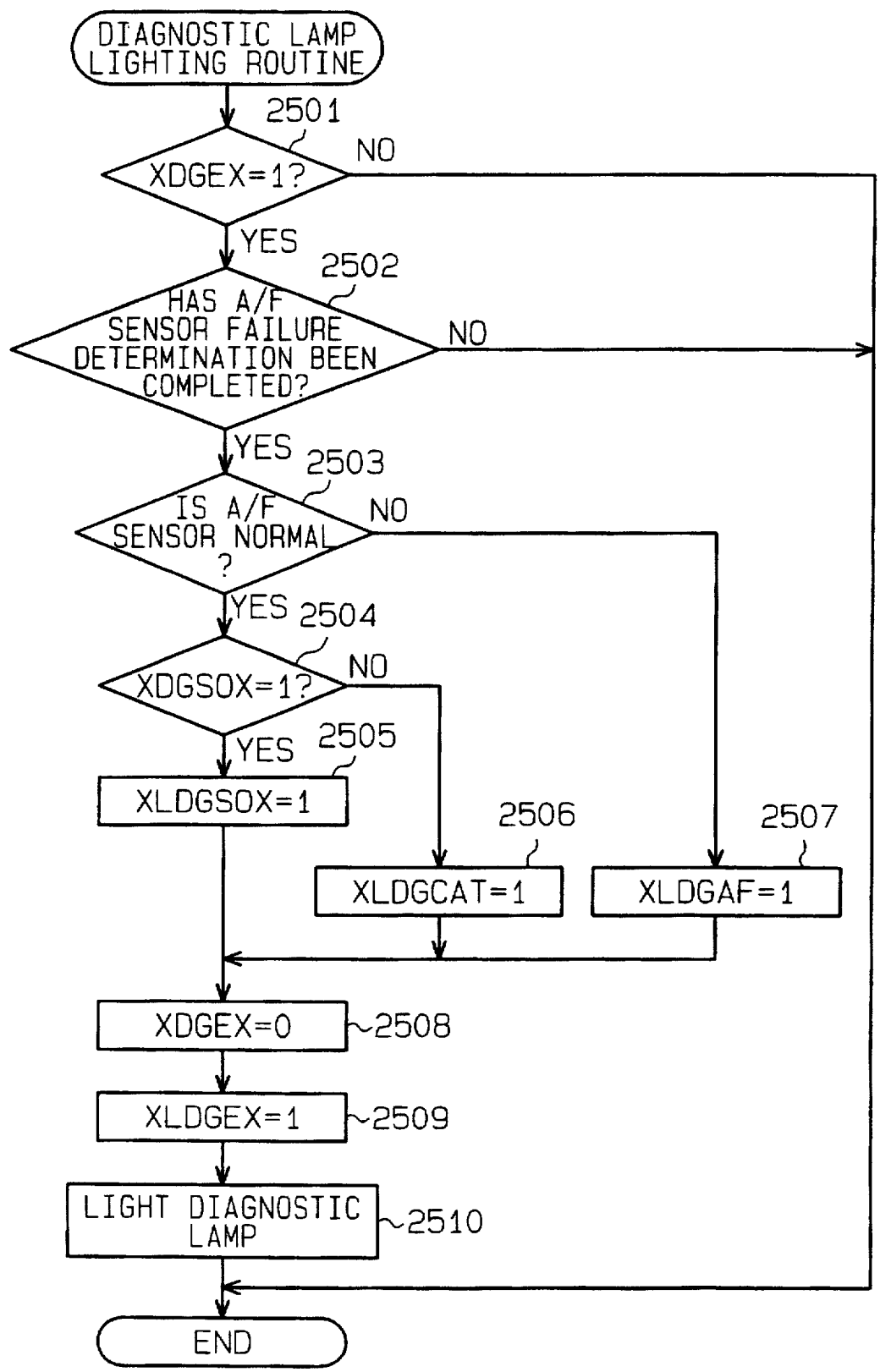
FIG. 35 is a flowchart of a diagnostic lamp lighting routine in the fifth embodiment.

FIG. 35 gives the flowchart of a diagnostic lamp lighting routine executed by use of the operation results provided by the various routines described above. The CPU 32 first checks in step 2501 to see if the exhaust system failure provisional flag XDGX is "1." In step 2502, the CPU 32 checks to see if the determination of the failure of the A/F sensor 26 (i.e., failure determination by the routine of FIG. 34) has been completed. If the result of the check in any one of steps 2501 and 2502 is negative, the CPU 32 immediately terminates this routine. If the results of the checks in steps 2501 and 2502 are both affirmative, the CPU 32 proceeds to step 2503. In step 2503, a check is made to see if the A/F sensor 26 is normal.

If the A/F sensor 26 is found to have failed, the CPU 32 goes to step 2507. In step 2507, an upstream sensor failure flag XLDGAF is set to "1." If the A/F sensor 26 is found to be normal, the CPU 32 goes to step 2504. In step 2504, a check is made to see if the downstream sensor failure provisional flag XDGSOX is "1." If XDGSOX=1, the CPU 32 proceeds to step 2505 in which a downstream sensor failure flag XLDGSO is set to "1." If XDGSOX=0 in step 2504, step 2506 is reached in which the CPU 32 sets a catalyst activation failure flag XLDGCAT to "1."

Having manipulated the failure flags as described, the CPU 32 proceeds to step 2508. In step 2508, the CPU 32 clears the exhaust system failure provisional flag XDGEX to "0." In step 2509, an exhaust system failure flag XLDGEX is set to "1." Finally, the CPU 32 goes to step 2510 and lights the diagnostic lamp 29.

The failure information acquired in steps 2505 through 2507 are separately stored in the backup RAM 25 inside the ECU 31. At the time of diagnosis by a diagnostic checker, an error display is given on the basis of the failure information stored individually.

As described, the failure detecting apparatus practiced as the fifth embodiment of the invention provides an unfailing diagnosis of the exhaust emission control device comprising the three-way catalytic converter 13, A/F sensor 26 and downstream O2 sensor 27. The diagnosis is carried out on the basis of the quantity of heat required from the start-up of the engine up to catalyst activation. With a device failure diagnosed in accordance with the detection level of the required quantity of heat as discussed, it is possible to know which of the device components failed.

In the fifth embodiment, the diagnostic lamp lighting routine of FIG. 35 lights the diagnostic lamp 26 upon completion of both the provisional determination of a failure in the exhaust emission control system and the determination of a failure in the A/F sensor 26. Alternatively, the diagnostic lamp 29 may be allowed to blink after the failure of the exhaust emission control device is provisionally determined. Following the determination of the failure in the A/F sensor 26, the diagnostic lamp 29 may be switched for continuous illumination. Another alternative is to have an independent display of the failure determination on the A/F sensor 26, i.e., irrespective of the provisional failure determination on the exhaust emission control device.

Further, in the fifth embodiment, the routine for determining the A/F sensor 26 for failure is illustratively implemented using the technique of FIG. 34. Alternatively, other known techniques may be employed, such as one for determining the A/F sensor 26 for failure on the basis of the internal resistance of the sensor device (i.e., of the solid-state electrolyte layer).

The present invention having been described with reference to the presently preferred embodiments should not be restricted but may be modified further in other ways without departing from the spirit of the invention.

What is claimed is:

1. A catalyst deterioration detecting apparatus comprising:
   a catalyst disposed in an exhaust system of an internal combustion engine;
   catalyst activation determining means for determining whether the catalyst is activated; and
   deterioration detecting means for detecting the deterioration of the catalyst when the catalyst is determined to be activated by the catalyst activation determining means, the deterioration being detected in accordance with the quantity of heat required from a start-up of the internal combustion engine until an activation of the catalyst.

2. A catalyst deterioration detecting apparatus according to claim 1, further comprising:
   accumulated intake air calculating means for calculating an accumulated quantity of intake air into the internal combustion engine since the start-up thereof,
   wherein the deterioration detecting means estimates the quantity of heat required to activate the catalyst on the basis of the accumulated quantity of intake air calculated by the accumulated intake air calculating means.

3. A catalyst deterioration detecting apparatus according to claim 1, further comprising:
   fuel injection quantity calculating means for calculating a quantity of injected fuel to be supplied to the internal combustion engine; and
   accumulated fuel quantity calculating means for calculating an accumulated quantity of injected fuel since the start-up of the internal combustion engine, wherein the deterioration detecting means estimates the quantity of heat required to activate the catalyst on the basis of the accumulated quantity of injected fuel calculated by the accumulated fuel quantity calculating means.

4. A catalyst deterioration detecting apparatus according to claim 1, further comprising:

an upstream air-fuel ratio sensor disposed upstream of the catalyst for detecting an upstream air-fuel ratio from exhaust gas of the internal combustion engine;

air-fuel ratio control means for controlling an air-fuel ratio so as to eliminate a deviation of the upstream air-fuel ratio detected by the upstream air-fuel ratio sensor from a target air-fuel ratio; and a downstream air-fuel ratio sensor disposed downstream of the catalyst for detecting a downstream air-fuel ratio from the exhaust gas having passed the catalyst, wherein the catalyst activation determining means determines whether the downstream air-fuel ratio detected by the downstream air-fuel ratio sensor is on a rich side or a lean side relative to a stoichiometric air-fuel ratio, the catalyst activation determining means further determining that the catalyst is activated when either a rich state or a lean state exceeds a predetermined time.

5. A catalyst deterioration detecting apparatus according to claim 4, wherein the downstream air-fuel ratio sensor is furnished with a heater for promoting activation.

6. A catalyst deterioration detecting apparatus according to claim 1, further comprising:

an upstream air-fuel ratio sensor disposed upstream of the catalyst for detecting an upstream air-fuel ratio from an exhaust gas of the internal combustion engine;

air-fuel ratio control means for controlling the air-fuel ratio so as to eliminate a deviation of the air-fuel ratio detected by the upstream air-fuel ratio sensor from a target air-fuel ratio; and a downstream air-fuel ratio sensor disposed downstream of the catalyst for detecting a downstream air-fuel ratio from the exhaust gas having passed the catalyst, wherein the catalyst activation determining means determines that the catalyst is activated when output signals from the downstream air-fuel ratio sensor fall within a predetermined range.

7. A catalyst deterioration detecting apparatus according to claim 1, wherein a deterioration detection level of the deterioration detecting means is changed in accordance with a warm-up state of the catalyst upon start-up of the internal combustion engine.

8. A catalyst deterioration detecting apparatus comprising:

a catalyst disposed in an exhaust system of an internal combustion engine;

catalyst activation determining means for determining whether the catalyst is activated;

first catalyst deterioration detecting means for detecting a deterioration of the catalyst when the catalyst is determined to be activated by the catalyst activation determining means, the deterioration being detected in accordance with a quantity of heat required from a start-up of the internal combustion engine until an activation of the catalyst;

a downstream air-fuel ratio sensor disposed downstream of the catalyst for detecting a downstream air-fuel ratio from the exhaust gas having passed the catalyst;

second catalyst deterioration determining means for determining the deterioration of the catalyst in accordance with an output characteristic of the downstream air-fuel ratio sensor while the catalyst is kept activated; and final catalyst deterioration determining means for determining whether the catalyst has deteriorated based on the determination by the first catalyst deterioration determining means as well as on the determination by the second catalyst deterioration determining means.

9. A catalyst deterioration detecting apparatus according to claim 8, further comprising:

an upstream air-fuel ratio sensor disposed upstream of the catalyst for detecting an upstream air-fuel ratio from an exhaust gas of the internal combustion engine;

air-fuel ratio control means for controlling the air-fuel ratio so as to eliminate a deviation of the air-fuel ratio detected by the upstream air-fuel ratio sensor from a target air-fuel ratio;

amplitude detecting means for detecting an amplitude of output signals from the downstream air-fuel ratio sensor;

target air-fuel ratio inverting means for inverting the target air-fuel ratio to a rich state and to a lean state; and response delay time measuring means for measuring a response delay time of the downstream air-fuel ratio sensor from a moment the target air-fuel ratio is inverted either to the rich state or to the lean state by the target air-fuel ratio inverting means, wherein the second catalyst deterioration determining means includes amplitude deterioration determining means and response time deterioration determining means, the amplitude deterioration determining means determining the deterioration of the catalyst on the basis of the amplitude detected by the amplitude detecting means and the response time deterioration determining means determining the deterioration of the catalyst on the basis of the response delay time measured by the response delay time measuring means.

10. A catalyst deterioration detecting apparatus according to claim 9, wherein the second catalyst deterioration determining means includes determining means for determining the catalyst to be normal while inhibiting the response time deterioration determining means from making deterioration determination when the amplitude deterioration determining means determines the catalyst to be normal.

11. A catalyst deterioration detecting apparatus according to claim 8, further comprising:

an upstream air-fuel ratio sensor disposed upstream of the catalyst for detecting an upstream air-fuel ratio from an exhaust gas of the internal combustion engine;

air-fuel ratio control means for controlling the air-fuel ratio so as to eliminate a deviation of the air-fuel ratio detected by the upstream air-fuel ratio sensor from a target air-fuel ratio;

auxiliary air-fuel ratio control means for controlling the air-fuel ratio so as to eliminate the deviation of the air-fuel ratio detected by the downstream air-fuel ratio sensor from the target air-fuel ratio;

target air-fuel ratio inverting means for inverting the target air-fuel ratio to a rich state and to a lean state; and response delay time measuring means for measuring a response delay time of the downstream air-fuel ratio sensor from a moment the target air-fuel ratio is inverted either to the rich state or to the lean state by the target air-fuel ratio inverting means, wherein the second catalyst deterioration determining means includes inverting period deterioration determining means and response time deterioration determining means, the inverting period deterioration determining means determining the deterioration of the catalyst on the basis of a period in which the target air-fuel ratio is inverted either to the rich state or to the lean state when the auxiliary air-fuel ratio control means controls the air-fuel ratio, and the response time deterioration determining means determining the deterioration of the catalyst on the basis of the response delay time measured by the response delay time measuring means.

12. A catalyst deterioration detecting apparatus according to claim 11, wherein the second catalyst deterioration determining means includes determining means for determining the catalyst to be normal while inhibiting the response time deterioration determining means from making deterioration determination when the inverting period deterioration determining means determines the catalyst to be normal.

13. A catalyst deterioration detecting apparatus according to claims 8, further comprising:

deterioration determination inhibiting means for inhibiting the second catalyst deterioration determining means from making deterioration determination when the first catalyst deterioration determining means determines the catalyst to have deteriorated, wherein the final catalyst deterioration determining means makes, while the deterioration determination inhibiting means is inhibiting the second catalyst deterioration determining means from making deterioration determination, a final determination that the catalyst has deteriorated on the basis of the determination by the first catalyst deterioration determining means.

14. A catalyst deterioration detecting apparatus according to claim 8, wherein the final catalyst deterioration determining means makes a final determination that the catalyst has deteriorated when the catalyst is determined to have deteriorated by at least one of the first and second catalyst deterioration determining means.

15. A catalyst deterioration detecting apparatus according to claim 8, wherein the first catalyst deterioration determining means makes one of at least three determinations denoting normality, possible deterioration and deterioration, based on the degree of catalyst deterioration.

16. A catalyst deterioration detecting apparatus according to claim 15, wherein the first catalyst deterioration determining means has a first and a second reference values which are used to determine the quantity of heat required to activate the catalyst since the start-up of the internal combustion engine, the second reference value being smaller than the first reference value, and wherein the first catalyst deterioration determining means further includes determining means for determining the catalyst to have deteriorated when the quantity of heat is not less than the first reference value, for determining the catalyst to have possibly deteriorated when the quantity of heat is not less than the second reference value and less than the first reference value, and for determining the catalyst to be normal when the quantity of heat is less than the second reference value.

17. A catalyst deterioration detecting apparatus according to claim 8, wherein the second catalyst deterioration determining means makes at least three determinations denoting normality, possible deterioration and deterioration, based on the degree of catalyst deterioration.

18. A catalyst deterioration detecting apparatus according to claim 8, wherein the first catalyst deterioration determining means makes at least three determinations denoting normality, possible deterioration and deterioration, based on the degree of catalyst deterioration, wherein the second catalyst deterioration determining means also makes at least three determinations denoting normality, possible deterioration and deterioration, based on the degree of catalyst deterioration, and wherein the final catalyst deterioration determining means makes a final determination that the catalyst has deteriorated when the catalyst is determined to have possibly deteriorated by the first catalyst deterioration determining means at the same time that the catalyst is determined to have possibly deteriorated by the second catalyst deterioration determining means.

19. An apparatus for detecting a failure of an exhaust emission control device, the apparatus comprising:

a catalyst disposed in an exhaust system of an internal combustion engine;

an upstream air-fuel ratio sensor disposed upstream of the catalyst for detecting an upstream air-fuel ratio from an exhaust gas of the internal combustion engine;

air-fuel ratio control means for controlling the air-fuel ratio so as to eliminate a deviation of the air-fuel ratio is detected by the upstream air-fuel ratio sensor from a target air-fuel ratio;

a downstream air-fuel ratio sensor disposed downstream of the catalyst for detecting a downstream air-fuel ratio from the exhaust gas having passed the catalyst;

catalyst activation determining means for determining whether the catalyst is activated on the basis of the responsiveness of the downstream air-fuel ratio sensor with respect to changes in the upstream air-fuel ratio; and exhaust system failure detecting means for detecting a failure of any one of the catalyst, the upstream air-fuel ratio sensor and the downstream air-fuel ratio sensor, in accordance with a quantity of heat required to activate the catalyst from a start-up of the internal combustion engine until activation of the catalyst, the failure being detected when the catalyst activation determining means determines the catalyst to be activated.

20. An apparatus for detecting a failure of an exhaust emission control device according to claim 19, wherein the catalyst activation determining means determines the catalyst to be activated when the responsiveness of the downstream air-fuel ratio sensor with respect to changes in the upstream air-fuel ratio has dropped to a predetermined level.

21. An apparatus for detecting a failure of an exhaust emission control device according to claim 19, further comprising:

target air-fuel ratio inverting means for forcibly inverting the target air-fuel ratio to a rich state and to a lean state under control of the air-fuel ratio control means, from a time the upstream and the downstream air-fuel ratio sensors are activated until a time the catalyst is activated.

22. An apparatus for detecting a failure of an exhaust emission control device according to claim 19, wherein the quantity of heat required from the start-up of the internal combustion engine until the activation of the catalyst is considered normal when falling between a first and a second reference value, the second reference value being smaller than the first reference value; and wherein the exhaust system failure detecting means determines either the catalyst or the upstream air-fuel ratio sensor to be faulty when the quantity of heat is greater than the first reference value.

23. An apparatus for detecting a failure of an exhaust emission control device according to claim 22, further comprising:

upstream sensor failure detecting means for detecting a failure of the upstream air-fuel ratio sensor without the use of the quantity of heat required from the start-up of the internal combustion engine until the activation of the catalyst, wherein the exhaust system failure detecting means includes catalyst failure determining means for determining the catalyst to be faulty when, with a failure of either the catalyst or the upstream air-fuel ratio sensor detected, the upstream sensor failure detecting means determines the upstream air-fuel ratio sensor to be normal.

24. An apparatus for detecting a failure of an exhaust emission control device according to claim 19, wherein the quantity of heat required from the start-up of the internal combustion engine until the activation of the catalyst is considered normal when falling between a first and a second reference values, the second reference value being smaller than the first reference value; and wherein the exhaust system failure detecting means determines either the upstream air-fuel ratio sensor or the downstream air-fuel ratio sensor to be faulty when the quantity of heat is less than the second reference value.

25. An apparatus for detecting a failure of an exhaust emission control device according to claim 24, further comprising:

upstream sensor failure detecting means for detecting a failure of the upstream air-fuel ratio sensor without the use of the quantity of heat required from the start-up of the internal combustion engine until the activation of the catalyst, wherein the exhaust system failure detecting means includes downstream sensor failure determining means for determining the downstream air-fuel ratio sensor to be faulty when, with a failure of either the upstream air-fuel ratio sensor or the downstream air-fuel ratio sensor detected, the upstream sensor failure detecting means determines the upstream air-fuel ratio sensor to be normal.

* * * * *